(12) United States Patent
Mitake et al.

(10) Patent No.: US 12,328,076 B2
(45) Date of Patent: Jun. 10, 2025

(54) BIDIRECTIONAL DC-DC CONVERTER, TRAFFIC SYSTEM, CONTROL METHOD, AND NON-TRANSITORY COMPUTER-READABLE STORAGE MEDIUM

(71) Applicant: MITSUBISHI HEAVY INDUSTRIES, LTD., Tokyo (JP)

(72) Inventors: Masaya Mitake, Tokyo (JP); Masanori Maruyama, Tokyo (JP); Keiji Nagasaka, Tokyo (JP); Yuji Maekawa, Tokyo (JP); Yuichiro Yazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 214 days.

(21) Appl. No.: 17/971,880

(22) Filed: Oct. 24, 2022

(65) Prior Publication Data

US 2023/0133167 A1    May 4, 2023

(30) Foreign Application Priority Data

Oct. 29, 2021   (JP) .................................. 2021-177699

(51) Int. Cl.
   *H02M 3/335*   (2006.01)
(52) U.S. Cl.
   CPC ..... *H02M 3/33584* (2013.01); *B60L 2210/10* (2013.01); *H02J 2310/48* (2020.01); *H02M 3/33573* (2021.05)
(58) Field of Classification Search
   CPC ............... H02M 3/01; H02M 3/33576; H02M 3/33584; B60L 1/00; B60L 9/18–22;
   (Continued)

(56) References Cited

U.S. PATENT DOCUMENTS 4,480,298 A * 10/1984 Fry .................. H02M 3/33561
                                                        363/128
2001/0007530 A1   7/2001 Hosotani
(Continued)

FOREIGN PATENT DOCUMENTS

CH          711843 A1 *  6/2017
CN         113263924 A   8/2021
(Continued)

OTHER PUBLICATIONS

Machine translation of JP 2002-369308, Dec. 20, 2002. Obtained from internal USPTO databases on Oct. 7, 2024. (Year: 2002).*

(Continued)

*Primary Examiner* — Fred E Finch, III
(74) *Attorney, Agent, or Firm* — HAUPTMAN HAM, LLP

(57) ABSTRACT

A bidirectional DC-DC converter includes a first circuit that is configured to process a first voltage being a DC voltage and that includes a first electronic component including a first switching element; a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element; and a control circuit configured to control switching of at least one of the first switching element and the second switching element wherein the bidirectional DC-DC converter is configured to convert the first voltage into the second voltage or convert the third voltage into the first voltage.

8 Claims, 22 Drawing Sheets

(58) Field of Classification Search
CPC ........ B60L 15/007; B60L 15/40; B60L 50/53; B60L 55/00; B60L 2210/10; H02J 1/00; H02J 1/14; H02J 7/34; H02J 2310/48
See application file for complete search history.

(56) References Cited

U.S. PATENT DOCUMENTS

| | | | |
|---|---|---|---|
| 2001/0012207 | A1 | 8/2001 | Nomura |
| 2013/0066501 | A1 * | 3/2013 | Oyama ............... B62D 6/08 701/22 |
| 2021/0159804 | A1 | 5/2021 | Yamada |
| 2021/0296993 | A1 * | 9/2021 | Liu ................ H02M 3/33592 |

FOREIGN PATENT DOCUMENTS

| | | | | |
|---|---|---|---|---|
| EP | 0486996 | A2 * | 5/1992 | ............. B60L 9/22 |
| EP | 3270482 | B1 * | 11/2019 | ............. B60L 50/53 |
| EP | 3251206 | B1 * | 10/2020 | ............. B60L 9/24 |
| JP | H11215841 | A | 8/1999 | |
| JP | 2000333448 | A | 11/2000 | |
| JP | 2001197740 | A | 7/2001 | |
| JP | 2002369308 | A * | 12/2002 | ............. B60L 11/005 |
| JP | 2006340448 | A | 12/2006 | |
| JP | 2008086078 | A | 4/2008 | |
| JP | 2011-130579 | A | 6/2011 | |
| JP | 2018137892 | A | 8/2018 | |
| JP | 2019103257 | A | 6/2019 | |
| JP | 6624729 | B2 | 12/2019 | |
| JP | 6747569 | B1 | 8/2020 | |
| WO | WO-2017195511 | A1 * | 11/2017 | ............. H02M 3/28 |

OTHER PUBLICATIONS

Machine translation of CH 711843 A1, Jun. 15, 2017. Obtained from https://worldwide.espacenet.com/ on Oct. 6, 2024. (Year: 2017).*

Machine translation of WO 2017195511, Nov. 16, 2017. Obtained from internal USPTO databases on Oct. 6, 2024. (Year: 2017).*

* cited by examiner

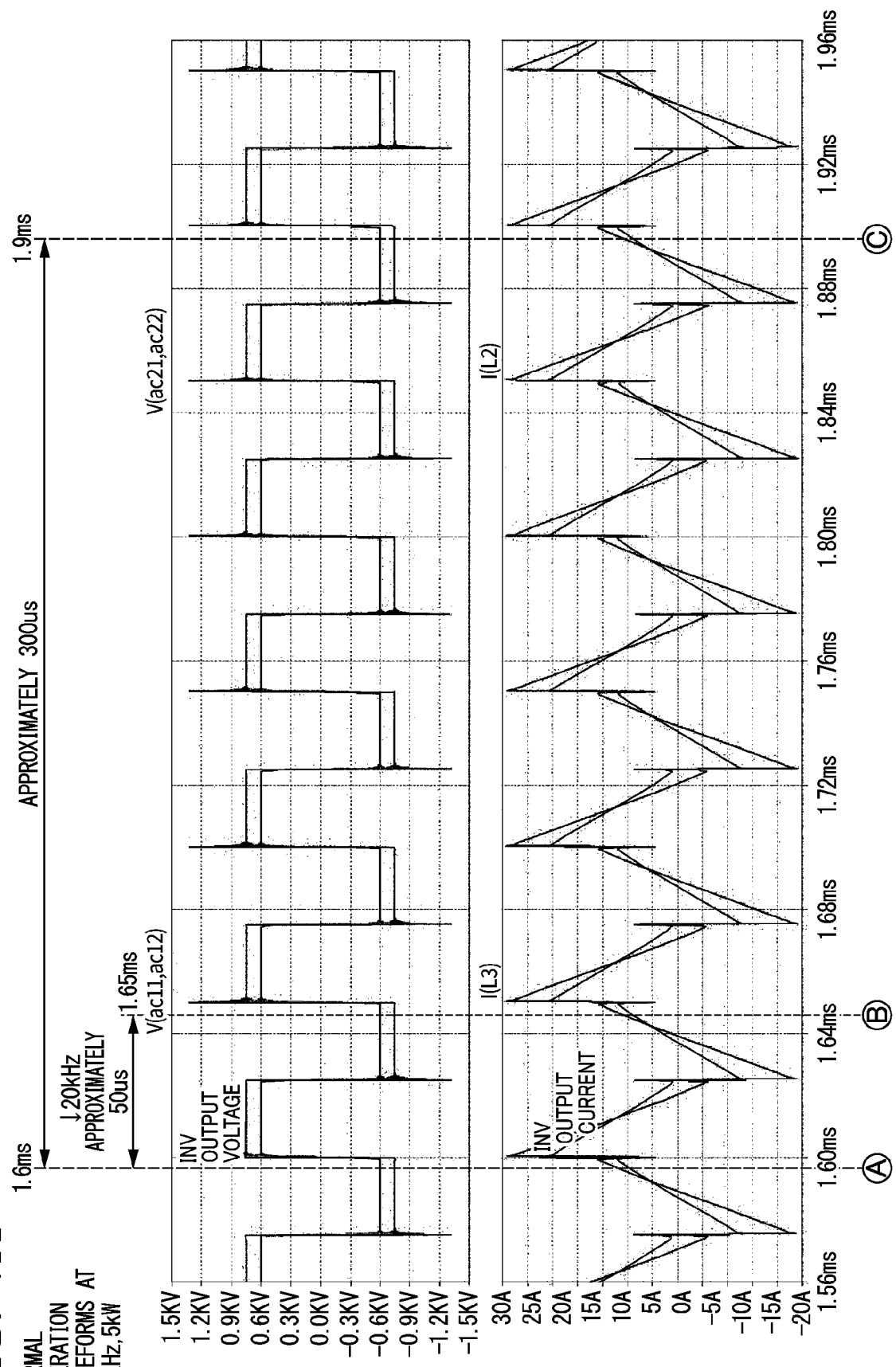

INTERMITTENT OPERATION WAVEFORMS AT 20kHz, 5kW
SET AT 5kW DURING PAUSE PERIOD

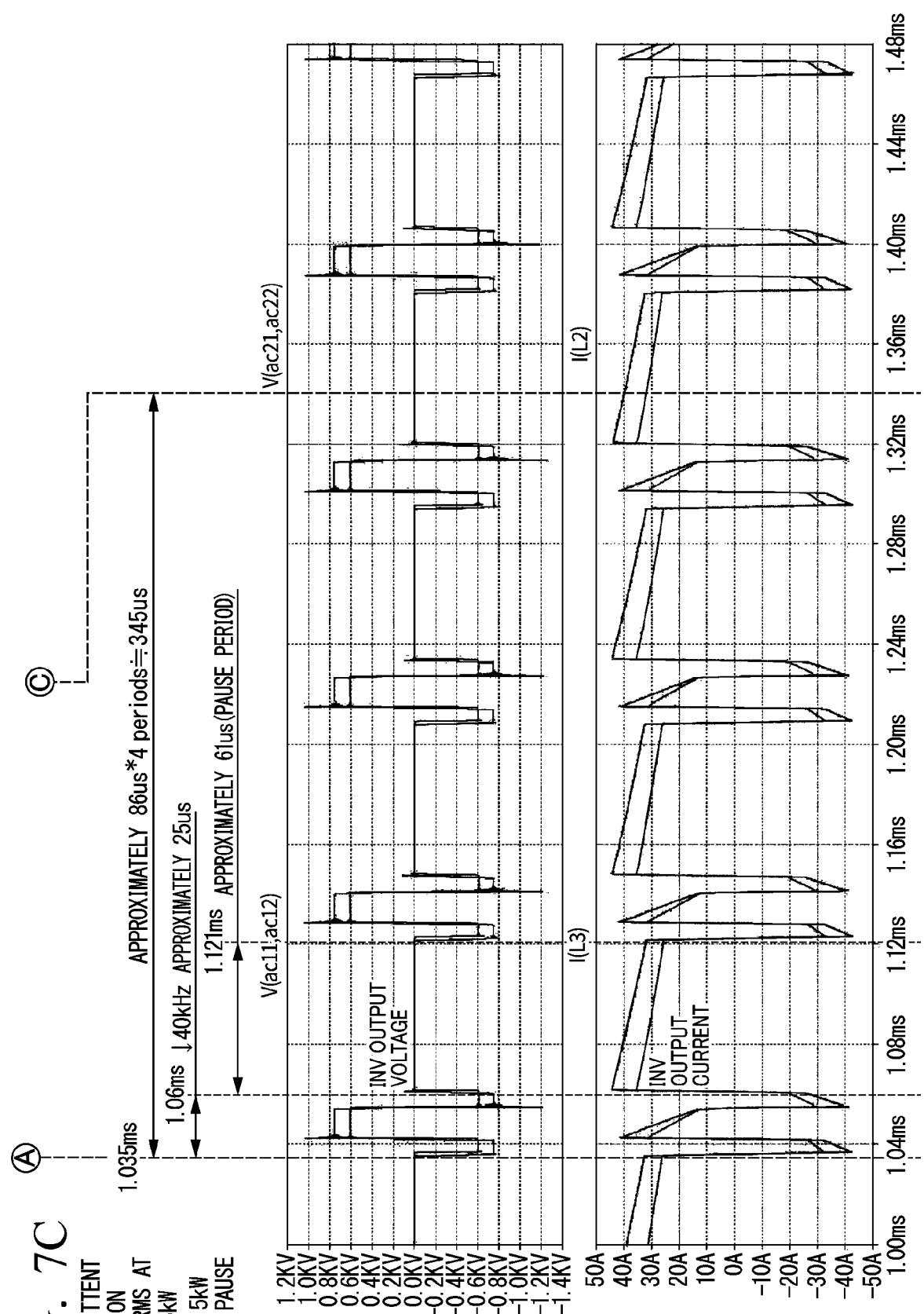

BIDIRECTIONAL DC-DC CONVERTER, TRAFFIC SYSTEM, CONTROL METHOD, AND NON-TRANSITORY COMPUTER-READABLE STORAGE MEDIUM

BACKGROUND OF THE INVENTION

Field of the Invention

The present disclosure, relates to a bidirectional DC-DC converter, a traffic system, a control method, and a non-transitory computer-readable storage medium.

Description of Related Art

As electric vehicles in traffic systems such as automated guideway transit (AGT) and an automated people mover (APM), there is an electric vehicle that travels using electric power supplied from an overhead line.

Patent Document 1 discloses, as a related technology, a technology related to voltage switching control of an electric vehicle.

[Patent Documents]
 [Patent Document 1] Japanese Unexamined Patent Application, First Publication No. 2011-130579

SUMMARY OF THE INVENTION

Electric vehicles that travel using electric power supplied from overhead lines may use electric components for railway vehicles that travel using electric power supplied from the overhead lines (for example, an electric vehicle shown in FIG. 21 to be described below). These electric components for railroad vehicles generally have a high withstand voltage (for example, 1700 volts) compared to the withstand voltage of electric components for an electric vehicle (EV) and general-purpose electric components (for example, 1200 volts). Electric components for railroad vehicles are generally more expensive than electric components for an electric vehicle (EV) and general-purpose electric components. Therefore, there is a demand for a technology that can realize the same function as when a high withstand voltage electric component is used even if an electric component including a high withstand voltage electronic component is replaced with an electric component including an electronic component with a lower withstand voltage than the electric component.

The present disclosure has been made in order to solve the problems described above, and an object thereof is to provide a bidirectional DC-DC converter, a traffic system, a control method, and a non-transitory computer-readable storage medium that can realize the sale function as when a high withstand voltage electric component is used even if an electric component including a high withstand voltage electronic component is replaced with an electric component including an electronic component with a lower withstand voltage than the electric component.

To solve the above problems, a bidirectional DC-DC converter according to the present disclosure includes a first circuit that is configured to process a first voltage being a DC voltage and that includes a first electronic component including a first switching element; second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element; and a control circuit configured to control switching of at least one of the first switching element and the second switching element wherein the bidirectional DC-DC converter is configured to convert the first voltage into the second voltage or convert the third voltage into the first voltage.

The traffic system according to the present disclosure includes the bidirectional DC-DC converter described above, and a host system that transmits a torque command to the bidirectional DC-DC converter.

A control method according to the present disclosure is a control method to be executed by a bidirectional DC-DC converter that includes a first circuit that is configured to process a first voltage being a DC voltage and that includes a first electronic component including a first switching element, and a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element, the method comprising: controlling switching of at least one of the first switching element and the second switching element; and converting the first voltage into the second voltage or converting the third voltage into the first voltage.

A non-transitory computer-readable storage medium storing a program according to the present disclosure causes a computer of a bidirectional DC-DC converter that includes a first circuit that is configured to process a first voltage being a DC voltage and that includes a first electronic component including a first switching element, and a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element to execute controlling at least one of the first switching element and the second switching element, and converting the first voltage into the second voltage or converting the third voltage into the first voltage.

According to the bidirectional DC-DC converter, traffic system, control method, and non-transitory computer-readable storage medium according to the present disclosure, even if an electric component including a high withstand voltage electronic component is replaced with an electric component including an electronic component with a lower withstand voltage than the electric component, it is possible to provide a bidirectional DC-DC converter that can realize the same function as when the high withstand voltage electric component is used.

BRIEF DESCRIPTION OF THE DRAWINGS

FIG. 7A is a first diagram for describing problems that occur when a DC-DC converter of a general DAB type is controlled.

FIG. 7C is a third diagram for describing problems that occur when a DC-DC converter of a general DAB type is controlled.

DETAILED DESCRIPTION OF THE INVENTION

First, a traffic system $1a$ to be compared with a traffic system $1$ according to each embodiment will be described.
(Configuration of Traffic System to be Compared)

Figure 21:
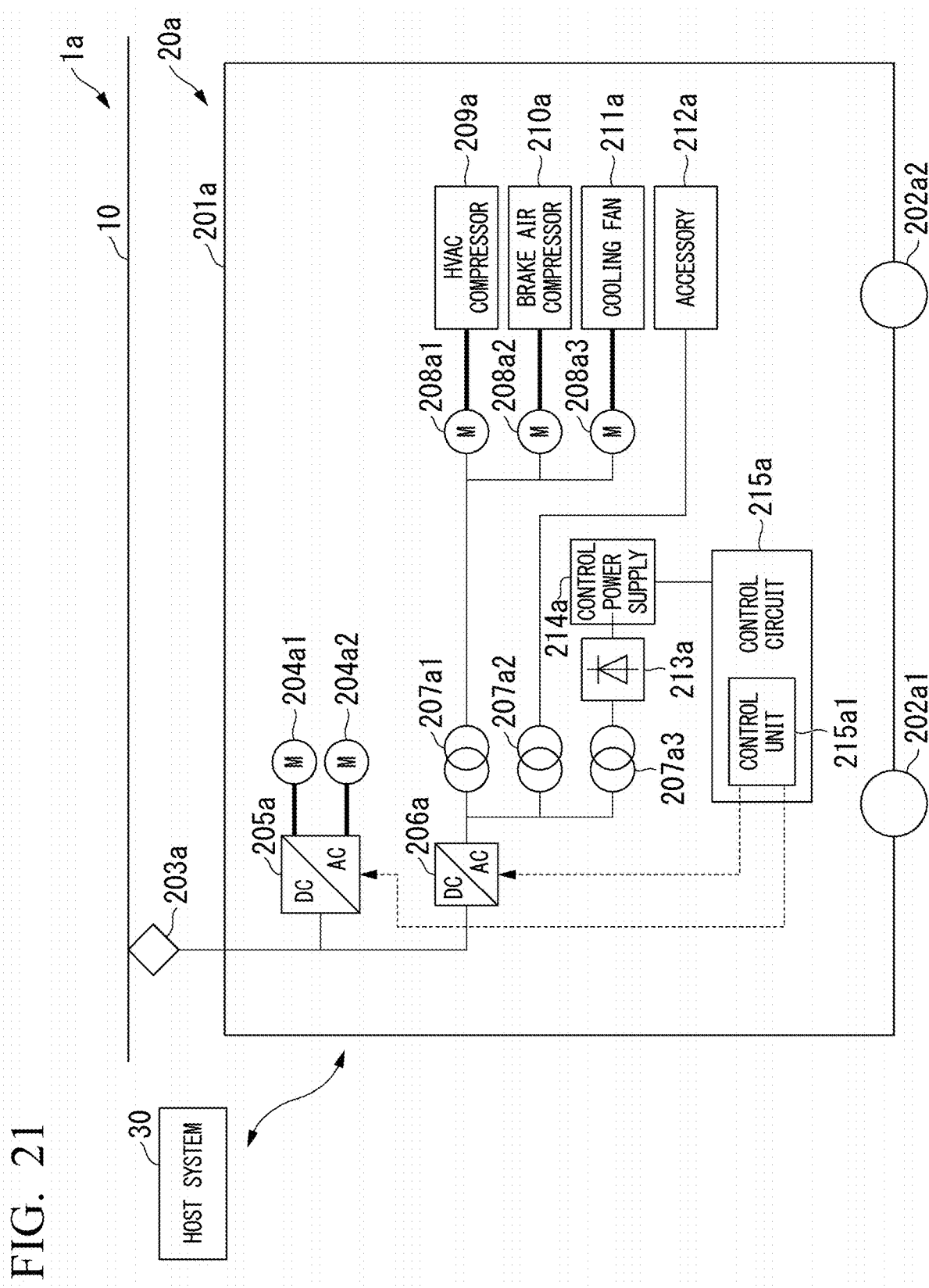
FIG. 21 is a diagram which shows an example of a configuration of a traffic system to be compared with the traffic systems according to each embodiment of the present disclosure.

FIG. 21 is a diagram which shows an example of a configuration of a traffic system $1a$ to be compared with the traffic system $1$ according to each embodiment of the present disclosure. The traffic system $1a$ includes an overhead line $10$, an electric vehicle $20a$, and a host system $30$, as shown in FIG. 21.

The overhead line $10$ supplies electric power to the electric vehicle $20a$. For example, the overhead line $10$ supplies electric power to the electric vehicle $20a$ at a predetermined DC voltage (for example, a DC voltage (nominal voltage) of 750 volts). This predetermined DC voltage can vary largely. For example, in "Section 5.2.1 of Japanese Industrial Standards (JIS)," Table 0A standard voltage and frequency for train lines and their fluctuation ranges in a supply of electric power from train lines, and a maximum voltage of 900 V and a minimum voltage of 500 V with a standard voltage of 750 V DC in Type 1 are described. In other words, the overhead line voltage with the standard voltage of 750 volts DC may fluctuate from 500 volts to 900 volts. The host system $30$ outputs a torque command to the electric vehicle $20a$.

The electric vehicle $20a$ operates using electric power supplied from an overhead line $10$ via a pantograph $203a$. The electric vehicle $20a$ includes, as shown in FIG. 21, a vehicle main body $201a$, wheels $202a1$ and $202a2$, a pantograph $203a$, motors $204a1$ and $204a2$, a variable-frequency drive or variable voltage variable frequency (VDF) inverter $205a$, an auxiliary power unit (APL) $206a$, transformers $207a1$, $207a2$, and $207a3$, motors $208a1$, $208a2$, and $208a3$, a heating, ventilation, and air conditioning (HVAC) compressor $209$, a brake air compressor $210$, a cooling fan $211$, an accessory $212$, a rectifier circuit $213a$, a control power supply $214a$, and a control circuit $215a$.

The vehicle main body $201a$ includes the motors $204a1$ and $204a2$, the VDF inverter $205a$, the APU $206a$, the transformers $207a1$, $207a2$, and $207a3$, the motors $208a1$, $208a2$, and $208a3$, an HVAC compressor $209a$, a brake air compressor $210a$, a cooling fan $211a$, an accessory $212a$, the rectifier circuit $213a$, the control power supply $214a$, and the control circuit $215a$.

The wheels $202a1$ are, for example, two front wheels. In addition, the wheels $202a2$ are, for example, two rear wheels. Each of the wheels $202a1$ and $202a2$ has, for example, a rubber tire.

The pantograph $203a$ receives electric power supplied from the overhead line $10$. The electric power received by the pantograph $203a$ is supplied to the VDF inverter $205a$ and the APU $206a$.

The motors $204a1$ and $204a2$ drive the wheels $202a1$ and $202a2$. For example, the rotor $204a1$ rotates the wheels $202a1$ according to an AC voltage output from the VDF inverter $205a$. In addition, for example, the motor $204a2$ rotates the wheels $202a2$ according to the AC voltage output from the VDF inverter $205a$.

The VDF inverter $205a$ converts a DC voltage into an AC voltage. The VDF inverter $205a$ is a VDF inverter for railroad vehicles, and is configured from electric components having a higher withstand voltage (for example, 1700 volts) than a withstand voltage of electronic components used in inverters for electric vehicles (EV) and general-purpose inverters for example, 1200 volts). Examples of the electronic components include resistors, capacitors, inductors, and semiconductor elements such as diodes and transistors.

Figure 22:
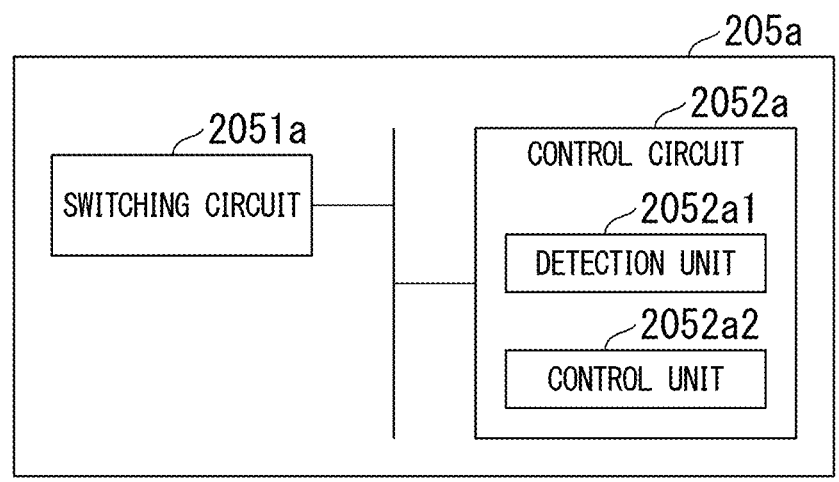
FIG. 22 is a diagram which shows an example of a configuration of a VFD inverter used in the traffic system to be compared with the traffic systems according to each embodiment of the present disclosure.

FIG. 22 is a diagram which shows an example of a configuration of the VDF inverter 205a used in the traffic system 1a to be compared with the traffic system 1 according to each embodiment of the present disclosure. The VDF inverter 205a includes a switching circuit 2051a and a control circuit 2052a as show in FIG. 22.

The switching circuit 2051a converts a DC voltage supplied from the overhead line 10 into an AC voltage to be supplied to the motors 204a1 and 204a2 by performing a switching operation under control of the control circuit 2052a.

The control circuit 2052a includes a detection unit 2052a1 and a control unit 2052a2, as shown in FIG. 22. The detection unit 2052a1 detects the amount of change in rotation speed (acceleration) of each of the motors 204a1 and 204a2. For example, the detection unit 2052a1 detects these amounts of change in the rotation speed as the amounts of change in a frequency of a motor current flowing through the motors 204a1 and 204a2. The detection unit 2052a1 may detect the amount of change in the rotation speed (acceleration) of each of the motors 204a1 and 204a2 using a rotation number sensor capable of detecting the number of rotations of the motors.

The control unit 2052a2 causes the switching circuit 2051a to switch so that the torque corresponds to a torque command from the host system 30. The VDF inverter 205 has a function of improving the idling when it is detected that the wheels 202a1 and 202a2 have idled. When the control unit 2052a2 detects the idling of wheels (that is, when it is determined that any one of the amounts of change in the frequency of the motor current flowing through the motors 204a1 and 204a2 exceeds an allowable value, or when it is determined that a difference in the number of rotations between a plurality of motors (here, the motor 204a1 and motor 204a2) has exceeded the allowable value)), the function of improving the idling of wheels involves performing control to narrow down a current value of the motor 204a1 or the motor 204a2 whose amount of change in the frequency of the motor current is determined to have exceeded the allowable value (that is, to reduce the torque of the motor 204a1 or motor 204a2). Control for improving the idling of wheels by reducing the member of rotations of a motor when the idling of wheels is detected is called "idling re-adhesion control" or "idling detection/re-adhesion control."

The APU 206a converts a DC voltage into an AC voltage. The converted AC voltage output by the APU 206a has fixed amplitude and frequency. The APU 206a is used as an auxiliary power supply device. The APU 206a is also configured from electronic components with a higher withstand voltage (for example, 1700 volts) than a withstand voltage of electronic components used in an inverter for EV or a general-purpose inverter (for example, 1200 volts), like the VDF inverter 205a. Since the electronic component of a high withstand voltage (for example, 1700 volts) is expensive, auxiliary power supply devices using the high withstand voltage electronic component used in the electric vehicle 20a are combined into one to be the APU 206a shown in FIG. 21, and thereby a manufacturing cost of the APU 206a is reduced.

The transformer 207a1 converts the AC voltage output by the APU 206a into an AC voltage that can drive the motors 208a1, 208a2, and 208a3. The transformer 207a2 converts the AC voltage output by the APU 206a into an AC voltage that can be supplied to the accessory 212a. The transformer 207a3 converts the AC voltage output by the APU 206a into an AC voltage such that a DC voltage rectified by the rectifier circuit 213a is large enough to be supplied to the control power supply 214a.

The motor 208a1 drives the HVAC compressor 209a. The motor 208a1 rotates according to an AC voltage with fixed amplitude and frequency; output by the transformer 207a1. That is, the motor 208a1 rotates with the fixed number of rotations.

The motor 208a2 drives the brake air compressor 210. The motor 208a2, like the motor 208a1, rotates with the fixed number of rotations.

A motor 208a3 drives the cooling fan 211. The motor 208a3, like the motors 208a1 and 208a2, rotates with the fixed number of rotations.

The HVAC compressor 209a sucks in the refrigerant that has evaporated in an air conditioner of the electric vehicle 20a and changes it into a liquid. The brake air compressor 210a generates compressed air that operates pneumatic equipment for applying a brake to the electric vehicle 20a. The cooling fan 211a cools a heat-generating portion within the vehicle main body 201a by circulating air in the heat-generating portion.

The accessory 212a operates using an AC voltage with fixed amplitude and frequency, output by the transformer 207a1, as a power supply. Examples of the accessory 212a include communication equipment, defrosters, and other equipment that operates when electric power is supplied through an outlet.

The rectifier circuit 213a rectifies the AC voltage with fixed amplitude and frequency, output by the transformer 207a3, and outputs the rectified DC voltage. Examples of the rectifier circuit 213a include a bridge circuit of diodes and the like.

The control power supply 214a generates a voltage (for example, 110 volts) for the control circuit 215a from the DC voltage output by the rectifier circuit 213a, and supplies the generated voltage to the control circuit 215a.

The control circuit 215a controls the electric vehicle 20a. The control circuit 215a includes a control unit 215a1, as shown in FIG. 21. For example, the control unit 215a1 controls the VDF inverter 205a and the APU 206a. Specifically, the control unit 215a1 controls an AC voltage output by the VDF inverter 205a and an AC voltage output by the APU 206a by generating a pulse width modulation (PWM) signal for each of the VDF inverter 205a and the APU 206a and controlling the VDF inverter 205a and the APU 206a with the generated PWM signal. In addition, the control unit 215a1 controls communication with the host system 30 in the electric vehicle 20a.

The host system 30 controls traveling of the electric vehicle 20a in the traffic system 1a. For example, the host system 30 outputs a torque command to the electric vehicle 20a, and the electric vehicle 20a travels according to the torque command.

The traffic system 1a to be compared with the traffic system 1 according to each embodiment of the present disclosure has been described above. The electric vehicle 20a described above is configured from electronic components with a high withstand voltage (for example, 1700 volts) such as the VDF inverter 205a and the APU 206a. In addition, the VDF inverter 205a has a function of improving the idling of wheels, which is usually not provided in an inverter. For this reason, the VDF inverter 205a becomes expensive, and as a result, the electric vehicle 20a also becomes expensive. Moreover, as described above, since the auxiliary power supply devices using the high withstand voltage electronic component used in the electric vehicle 20a are combined into one to be the APU 206a, the motors 208a1, 208a2, and 208a3 rotate with the fixed number of rotations. For this reason, drive efficiency of the motors 208a1, 208a2 and 208a3 is lower than the drive efficiency when the motors 208a1, 208a2 and 208a3 are driven by an inverter with a varying frequency.

First Embodiment

Hereinafter, an embodiment will be described in detail with reference to the drawings. First, the traffic system 1 according to a first embodiment of the present disclosure will be described.

(Configuration of Traffic System)

Figure 1:
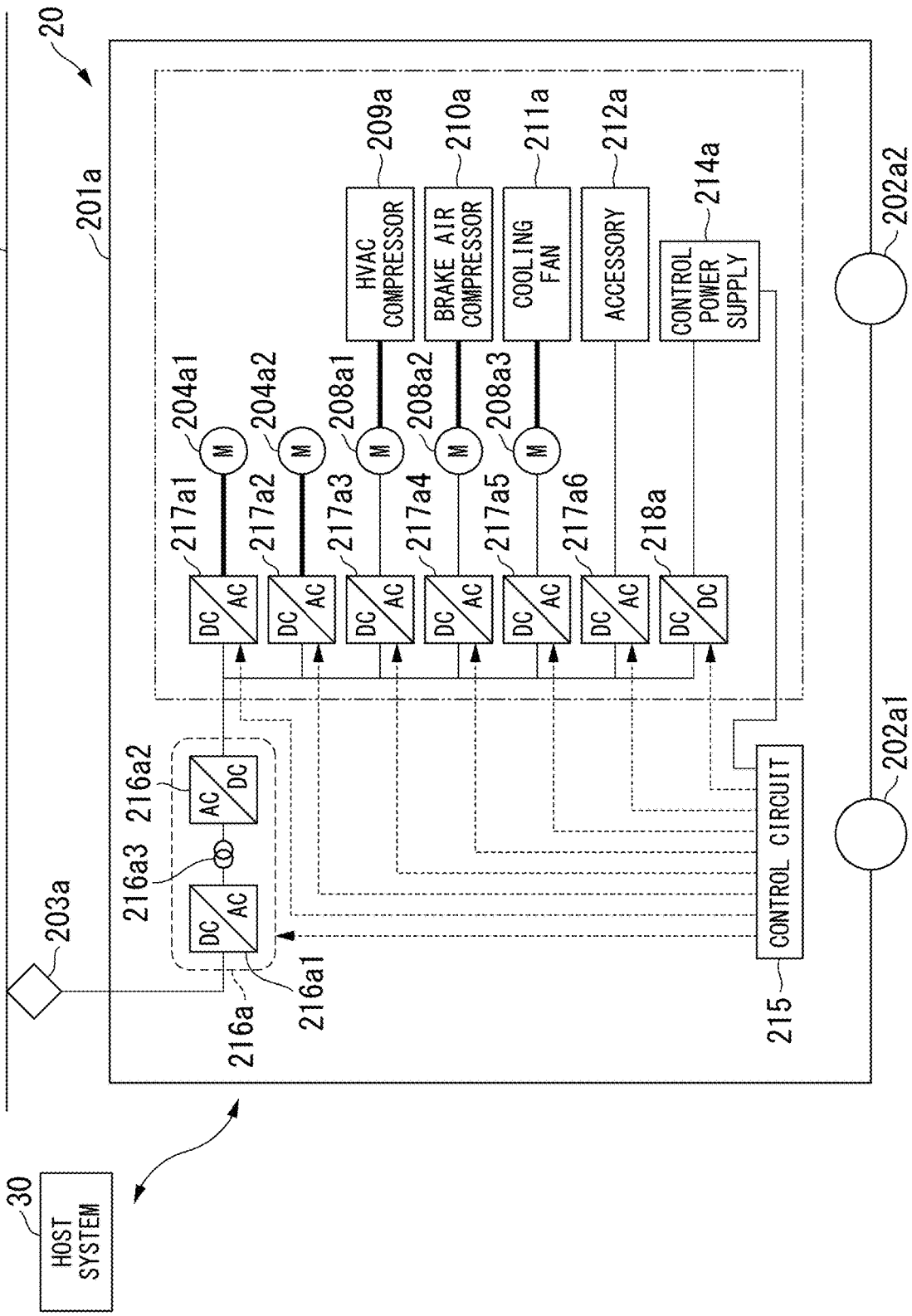
FIG. 1 is a diagram which shows a configuration of a traffic system according to a first embodiment of the present disclosure.

FIG. 1 is a diagram which shows a configuration of the traffic system 1 according to the first embodiment of the present disclosure. The traffic system 1 includes, as shown in FIG. 1, an overhead line 10, an electric vehicle 20, and a host system 30. The traffic system 1 is a system in which the number of high withstand voltage electronic components is reduced compared to the number of high withstand voltage electronic components used in the electric vehicle 20a to be compared by providing an insulated DC-DC converter between the overhead line 10 and the electric vehicle 20 and using electronic components with a high withstand voltage (for example 1700 volts) only on the overhead line 10 side in the DC-DC converter.

The overhead line 10 supplies electric power to the electric vehicle 20. For example, the overhead line 10 supplies electric power to the electric vehicle 20 at a predetermined DC voltage (for example, a DC voltage (nominal voltage) of 750 volts). This predetermined DC voltage may vary largely. For example, in an overhead line voltage with a standard voltage of 750 volts, the predetermined DC voltage may vary from 500 volts to 900 volts.

The electric vehicle 20 operates using electric power supplied from the overhead line 10 via the pantograph 203a. The electric vehicle 20 includes, as shown in FIG. 1, the vehicle main body 201a, the wheels 202a1 and 202a2, the pantograph 203a, the motors 204a1 and 204a2, the motors 208a1, 208a2, and 208a3, the HVAC compressor 209a, the brake air compressor 210a, the cooling fan 211a, the accessory 212a, the control power supply 214a, a control circuit 215, a DC-DC converter 216a, inverters 217a1, 217a2, 217a3, 217a4, 217a5, and 217a6, and a DC-DC converter 218a.

The vehicle main body 201a stores each of the motors 204a1 and 204a2, the motors 208a1, 208a2, and 208a3, the HVAC compressor 209a, the brake air compressor 210a, the cooling fan 211a, the accessory 212a, the control power supply 214a, the DC-DC converter 216a, the inverter 217a1, 217a2, 217a3, 217a4, 217a5, and 217a6, and the DC-DC converter 218a.

The wheels 202a1 are, for example, two front wheels. The wheels 202a2 are, for example, two rear wheels. Each of the wheels 202a1 and 202a2 has, for example, a rubber tire.

The pantograph 203a receives electric power supplied from the overhead line 10. The electric power received by the pantograph 203a is supplied to the DC-DC converter 216a.

The motors 204a1 and 204a2 drive the wheels 202a1 and 202a2. For example, the motor 204a1 rotates the wheels 202a1 according to an AC voltage output from the inverter 217a1. In addition, for example, the motor 204a2 rotates the wheels 202a2 according to an AC voltage output from the inverter 217a2.

The motor 208a1 drives the HVAC compressor 209a. The motor 208a1 rotates according to an AC voltage output by the inverter 217a3.

The motor 208a2 drives the brake air compressor 210a. The motor 208a2 rotates according to an AC voltage output by the inverter 217a4.

The motor 208a3 drives the cooling fan 211a. The motor 208a3 rotates according to an AC voltage output by the inverter 217a5.

The HVAC compressor 209a sucks in a refrigerant that has evaporated in an air conditioner of the electric vehicle 20 and changes it into liquid. The brake air compressor 210a generates compressed air that operates pneumatic equipment for applying a brake to the electric vehicle 20. The cooling fan 211 cools a heat-generating portion within the vehicle main body 201a by circulating air in the heat-generating portion.

The accessory 212a operates using an AC voltage output from the inverter 217a6 as a power source. Examples of the accessory 212a include communication equipment, defrosters, and other equipment that operates when electric power is supplied through an outlet.

The control power supply 214a generates a voltage for the control circuit 215 from a DC voltage output by the DC-DC converter 218a, and supplies the generated voltage to the control circuit 215.

Figure 2:
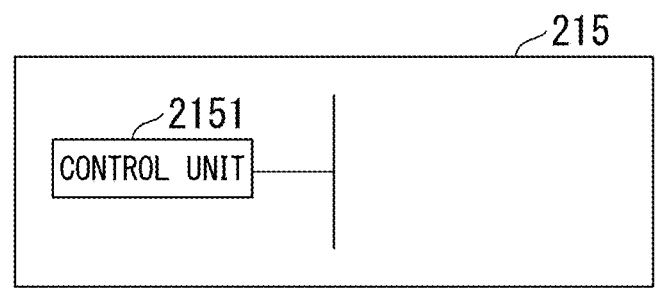
FIG. 2 is a diagram which shows an example of a configuration of a control circuit according to the first embodiment of the present disclosure.

The control circuit 215 controls the electric vehicle 20. FIG. 2 is a diagram which shows an example of a configuration of the control circuit 215 according to the first embodiment of the present disclosure. The control circuit 215 has a control unit 2151 as shown in FIG. 2.

The control unit 2151 controls the DC-DC converter 216a, the inverters 217a1, 217a2, 217a3, 217a4, 217a5, and 217a6, and the DC-DC converter 218a. Specifically, the control unit 2151 controls AC voltages output from each of the DC-DC converter 216a and the inverters 217a1, 217a2, 217a3, 217a4, 217a5 and 217a6 by generating a PWM signal for each of the DC-DC converter 216a and the inverters 217a1, 217a2, 217a3, 217a4, 217a5, and 217a6, and controlling the DC-DC converter 216a and the inverters 217a1, 217a2, 217a3, 217a4, 217a5 and 217a6 using the generated PWM signal. In addition, specifically, the control unit 2151 controls the DC voltage output from the DC-DC converter 218a by performing chopper control for a switching element of the DC-DC converter 218a.

Also, the control unit 2151 controls communication with the host system 30 in the electric vehicle 20. Control by the control unit 2151 is performed via, for example, a controller area network (CAN) communication.

The DC-DC converter 216a is an insulated bidirectional DC-DC converter capable of transmitting a voltage in both of a direction from the overhead line 10 side to the electric vehicle 20 side and a direction from the electric vehicle 20 side to the overhead line 10 side.

For example, the DC-DC converter 216a includes an inverter 216a1, a converter 216a2, and a transformer 216a3 when electric power is transmitted from the overhead line 10 side to the electric vehicle 20 side. The inverter 216*a*1 converts a DC voltage of the overhead line 10 into an AC voltage. The inverter 216*a*1 is configured from electronic components with a high withstand voltage (for example, 1700 volts).

The converter 216*a*2 converts an AC voltage transmitted from a primary side (that is, the overhead line 10 side) of the transformer 216*a*3 to a secondary side (the electric vehicle 20 side) into a DC voltage. The converter 216*a*2 is configured from electronic components with a lower withstand voltage (for example, 1200 volts) than the inverter 216*a*1.

The transformer 216*a*3 converts an AC voltage output by the inverter 216*a*1 into an AC voltage in accordance with a winding ratio between the primary side and the secondary side such that a DC voltage output by the converter 216*a*2 is a DC voltage of magnitude suitable for each of the inverters 217*a*1, 217*a*2, 217*a*3, 217*a*4, 217*a*5, and 217*a*6, and the DC-DC converter 218*a*.

In addition, when electric power is transmitted from the electric vehicle 20 side to the overhead line 10 side (for example, when the electric vehicle 20 applies an electric brake and regenerative electric power is generated in the electric vehicle 20), the DC-DC converter 216*a* includes the inverter 216*a*2, the converter 216*a*1, and the transformer 216*a*3 after swapping the inverter and the converter each other. The operation of the DC-DC converter 216*a* when electric power is transmitted from the electric vehicle 20 side to the overhead line 10 side can be considered similar to the operation of the DC-DC converter 216*a* when electric power is transmitted from the overhead line 10 side to the electric vehicle 20 side by replacing the inverter 216*a*1 with the converter 216*a*2, and the converter 216*a*2 with the converter 216*a*1, respectively, and furthermore swapping the primary side and the secondary side of the transformer 216*a*3 each other in the operation described above of the DC-DC converter 216*a* when electric power is transmitted from the overhead line 10 side to the electric vehicle 20 side.

The inverter 217*a*1 converts the DC voltage output by the DC-DC converter 216*a* into an AC voltage that drives the motor 204*a*1. The inverter 217*a*1 is configured from electronic components with a low withstand voltage (for example, 1200 volts). An amplitude and a frequency of the AC voltage output by the inverter 217*a*1 are not fixed and can be changed depending on a situation.

The inverter 217*a*2 converts the DC voltage output by the DC-DC converter 216*a* into an AC voltage that drives the motor 204*a*2. The inverter 217*a*2 is configured from the electronic components with a low withstand voltage (for example, 1200 volts). An amplitude and a frequency of the AC voltage output by the inverter 217*a*2 are not fixed and can be changed depending on a situation.

The inverter 217*a*3 converts the DC voltage output from the DC-DC converter 216*a* into an AC voltage that drives the motor 208*a*1. The inverter 217*a*3 is configured from the electronic components with a low withstand voltage (for example, 1200 volts). An amplitude and a frequency of the AC voltage output by the inverter 217*a*3 are not fixed and can be changed depending on a situation.

The inverter 217*a*4 converts the DC voltage output by the DC-DC converter 216*a* into an AC voltage that drives the motor 208*a*2. The inverter 217*a*4 is configured from the electronic components with a low withstand voltage (for example, 1200 volts). An amplitude and a frequency of the AC voltage output by the inverter 217*a*4 are not fixed and can be changed depending on a situation.

The inverter 217*a*5 converts the DC voltage output by the DC-DC converter 216*a* into an AC voltage that drives the motor 208*a*3. The inverter 217*a*5 is configured from the electronic components with a low withstand voltage (for example, 1200 volts). An amplitude and a frequency of the AC voltage output by the inverter 217*a*5 are not fixed and can be changed according to a situation.

The inverter 217*a*6 converts the DC voltage output by the DC-DC converter 216*a* into an AC voltage that can be supplied to the accessory 212*a*. The inverter 217*a*6 is configured from the electronic components with a low withstand voltage (for example, 1200 volts). An amplitude and a frequency of the AC voltage output by the inverter 217*a*6 are not fixed and can be changed depending on a situation.

The DC-DC converter 218*a* converts the DC voltage output by the DC-DC converter 216*a* into a DC voltage that can be supplied to the control power supply 214*a*.

The host system 30 controls traveling of the electric vehicle 20 in the traffic system 1. For example, the host system 30 outputs a torque command to the electric vehicle 20, and the electric vehicle 20 travels according to the torque command (Advantage)

The traffic system 1 according to the first embodiment of the present disclosure has been described above. In the DC-DC converter 216*a* of the traffic system 1, the inverter 216*a*1 is configured from electronic components with a high withstand voltage (fir example, 1700 volts), and the converter 216*a*2 is configured from electronic components with a low withstand voltage (for example, 1200 volts). By configuring the DC-DC converter 216*a* of the traffic system 1 in this manner, even if an electric component including a high withstand voltage electronic component is replaced with an electric component including an electronic component with a lower withstand voltage than the electric component, it is possible to provide a bidirectional DC-DC converter that can realize the same function as when the high withstand voltage electric component is used.

First Modified Example of the First Embodiment

Next, the traffic system 1 according to a first modified example of the first embodiment of the present disclosure will be described. The traffic system 1 according to the first modified example of the first embodiment is a system having a function of improving the idling of wheels, like the VDF inverter 205*a* of the electric vehicle 20*a* to be compared.

In the first modified example of the first embodiment, the function of improving the idling of wheels is realized by the control circuit 215, the host system 30, and wheel rotation sensors 40*a*1 and 40*a*2 to be described below. A difference between the traffic system 1 according to the first modified example of the first embodiment and the traffic system 1 according to the first embodiment will be described below.

(Configuration of Traffic System)

Figure 3:
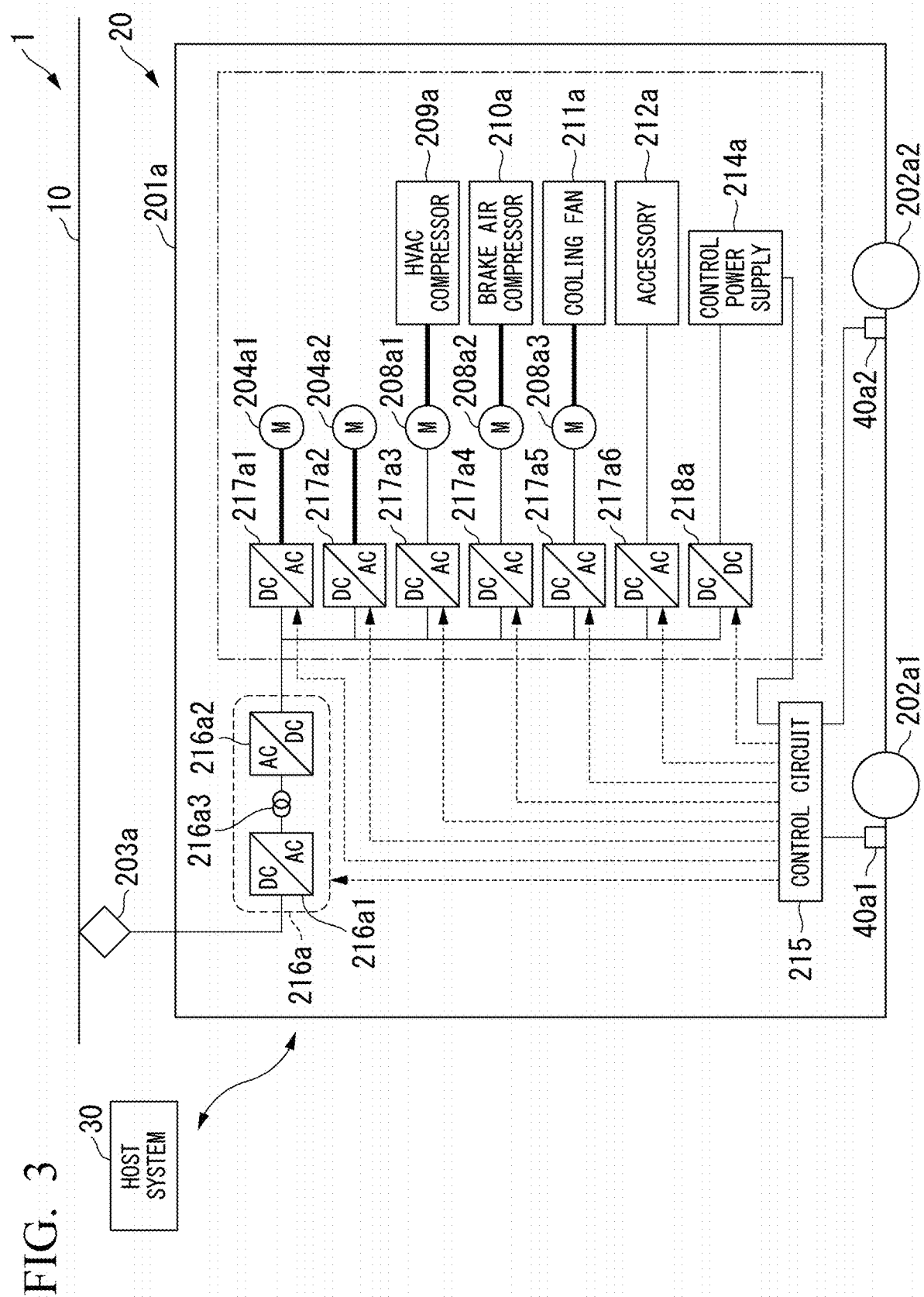
FIG. 3 is a diagram which shows an example of a configuration of a traffic system according to a first modified example of the first embodiment of the present disclosure.

FIG. 3 is a diagram which shows an example of the configuration of the traffic system 1 according to the first modified example of the first embodiment of the present disclosure. The traffic system 1 according to the first modified example of the first embodiment includes, similar to the traffic system 1 of the first embodiment shown in FIG. 1, the vehicle main body 201*a*, the wheels 202*a*1 and 202*a*2, the pantograph 203*a*, the motors 204*a*1 and 204*a*2, the motors 208*a*1, 208*a*2, and 208*a*3, the HVAC compressor 209*a*, the brake air compressor 210*a*, the cooling fan 211*a*, the accessory 212*a*, the control power supply 214*a*, the control circuit 215, the DC-DC converter 216*a*, the inverters 217*a*1, 217*a*2, 217*a*3, 217*a*4, 217*a*5, and 217*a*6, and the DC-DC converter 218a. However, the control circuit 215 according to the first modified example of the first embodiment differs from the control circuit 215 according to the first embodiment. In addition, the traffic system 1 according to the first modified example of the first embodiment further includes rotation sensors 40a1 and 40a2.

The rotation sensor 40a1 detects the number of rotations of the wheels 202a1 per unit time. The rotation sensor 40a2 detects the number of rotations of the wheels 202a2 per unit time.

Figure 4:
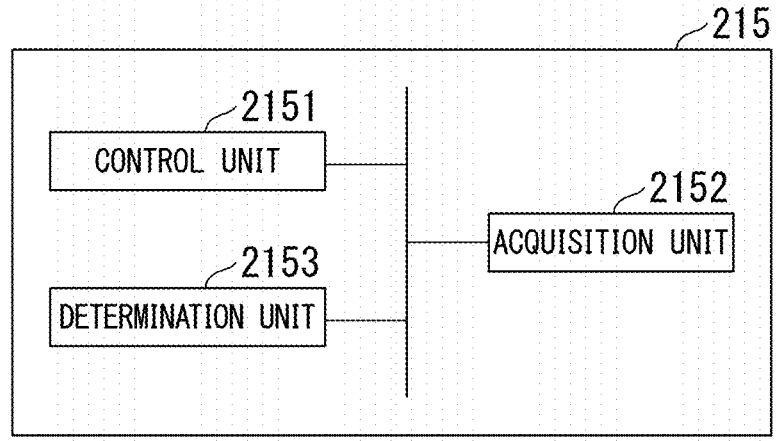
FIG. 4 is a diagram which shows an example of a configuration of a control circuit according to the first modified example of the first embodiment of the present disclosure.

The control circuit 215 controls the electric vehicle 20. FIG. 4 is a diagram which shows an example of the configuration of the control circuit 215 according to the first modified example of the first embodiment of the present disclosure. The control circuit 215 includes, as shown in FIG. 4, a control unit 2151, an acquisition unit 2152, and a determination unit 2153.

The acquisition unit 2152 acquires results of detecting the number of rotations from each of the rotation sensors 40a1 and 40a2.

The determination unit 2153 calculates the rate of change in the number of rotations of the wheels 202a1 per unit time and the rate of change in the number of rotations of the wheels 202a2 per unit time from each result of detection acquired by the acquisition unit 2152 (that is, the number of rotations of the wheels 202a1 per unit time and the number of rotations of the wheels 202a2 per unit time), compares between these rates, and determines the idling of the axles (that is, the front and rear axle) on the basis of a result of the comparison. For example, when the rate of change in the number of rotations of the wheels 202a2 per unit time with respect to the rate of change in the number of rotations of the wheels 202a1 deviates from a range of the rate of change in the number of rotations of the wheels 202a2 per unit time determined in advance based on the rate of change in the number of rotations of the wheels 202a1 per unit time, that is, an allowable value of the rate of change in the number of rotations, the determination unit 2153 determines that an axle to which wheels with the higher rate of change in the number of rotations per unit time are connected is idling. In addition, the determination unit 2153 determines that the axles are not idling when it does not deviate from the range of the rate of change in the number of rotations, that is, the allowable value of the rate of change in the number of rotations. The determination unit 2153 may determine whether the idling of the axles occurs by using "the number of rotations of wheels 202a1 per unit time and the number of rotations of wheels 202a2 per unit time" instead of "the rate of change in the number of rotations of the wheels 202a1 per unit time and the rate of change in the number of rotations of the wheels 202a2 per unit time."

The control unit 2151 controls the DC-DC converter 216a, the inverters 217a1, 217a2, 217a3, 217a4, 217a5, and 217a6, and the DC-DC converter 218a, like the control unit 2151 according to the first embodiment. Specifically, the control unit 2151 generates a PWM signal for each of the DC-DC converter 216a, and the inverters 217a1, 217a2, 217a3, 217a4, 217a5, and 217a6, and controls the DC-DC converter 216a, and the inverters 217a1, 217a2, 217a3, 217a4, 217a5 and 217a6 using the generated PWM thereby controlling AC voltages output from each of the DC-DC converter 216a, and the inverters 217a1, 217a2, 217a3, 217a4, 217a5 and 217a6. In addition, specifically, the control unit 2151 controls a DC voltage output from the DC-DC converter 218a by performing chopper control for switching elements of the DC-DC converter 218a.

Moreover, the control unit 2151 controls communication with the host system 30 in the electric vehicle 20, like the control unit 2151 according to the first embodiment. However, in the first modified example of the first embodiment, the control unit 2151 controls each of the inverters 217a1 and 217a2 on the basis of a result of determination by the determination unit 2053. Specifically, when the determination unit 2053 determines that an axle is idling (that is, at least one of the front and rear axles), the control unit 2151 controls an inverter (that is the inverter 217a1 or the inverter 217a2) corresponding to each individual axle to reduce the torque of wheels (that is, the wheels 202a1 or the wheels 202a2) that are connected to the axle determined to be idling. A degree of torque reduction is determined by a combination of the control content of the control unit 2151 for the inverter and the rate of change in the number of rotations of the wheels per unit time. In this manner, the control unit 2151 controls each of the inverters 217a1 and 217a2 on the basis of a result of the determination by the determination unit 2053, and thereby it is possible to immediately improve the idling of axles even when at least one of the from and rear axles idles.

In addition to the functions possessed by the host system 30 according to the first embodiment, the host system 30 has a function of detecting the amount of change in rotation speed (acceleration) of each of the motors 204a1 and 204a2, like a detection unit 2051a1 and a control unit 2052a2 provided in the VDF inverter 205a of the electric vehicle 20a to be compared. In addition, when the host system 30 detects the idling of both axles (front and rear axles) (in the example shown here, when it is determined that the amount of change in the frequency of both motor currents flowing through the motors 204a1 and 204a2 has exceeded the allowable value), it has a function of transmitting a torque command that narrows down the current values of the motors 204a1 and 204a2 (that is, reduces the torque of the motor 204a1 and the motor 204a2) determined that the amount of change in the frequency of the motor current has exceeded the allowable value to the electric vehicle 20.

Specifically; the host system 30 controls the traveling of the electric vehicle 20 in the traffic system 1. For example, the host system 30 outputs a torque command to the electric vehicle 20, and the electric vehicle 20 travels according to the torque command. However, the host system 30 detects the amount of change in the rotation speed (acceleration) of each of the motors 204a1 and 204a2. For example, the host system 30 detects the amount of change in the rotation speeds as the amount of change in the frequency of the motor current flowing through the motors 204a1 and 204a2. When the host system 30 determines whether the amount of change in the frequency of both motor currents flowing through the motors 204a1 and 204a2 exceeds the allowable value, and determines that the amount of change in the frequency of both motor currents has exceeded the allowable value, it determines that both axles are idling. In addition, when the host system 30 determines that the amount of change in the frequency of at least one of the motor currents does not exceed the allowable value, it determines that the idling of both axles does not occur.

Then, when the host system 30 detects the idling of both axles (in the example shown here, when it determines that the amount of change in the frequency of both motor currents flowing through the motors 204a1 and 204a2 has exceeded the allowable value), it transmits a torque command that narrows down the current values of the motors 204a1 and 204a2 (that is, reduces the torque of the motor 204a1 and the motor 204a2) determined that the amount of change in the frequency of the motor current has exceeded the allowable value to the electric vehicle 20. In this case, the control unit 2151 of the electric vehicle 20 controls each of the inverters 217a1 and 217a2 according to the torque command transmitted from the host system 30.

(Processing Performed by Traffic System)

Figure 5:
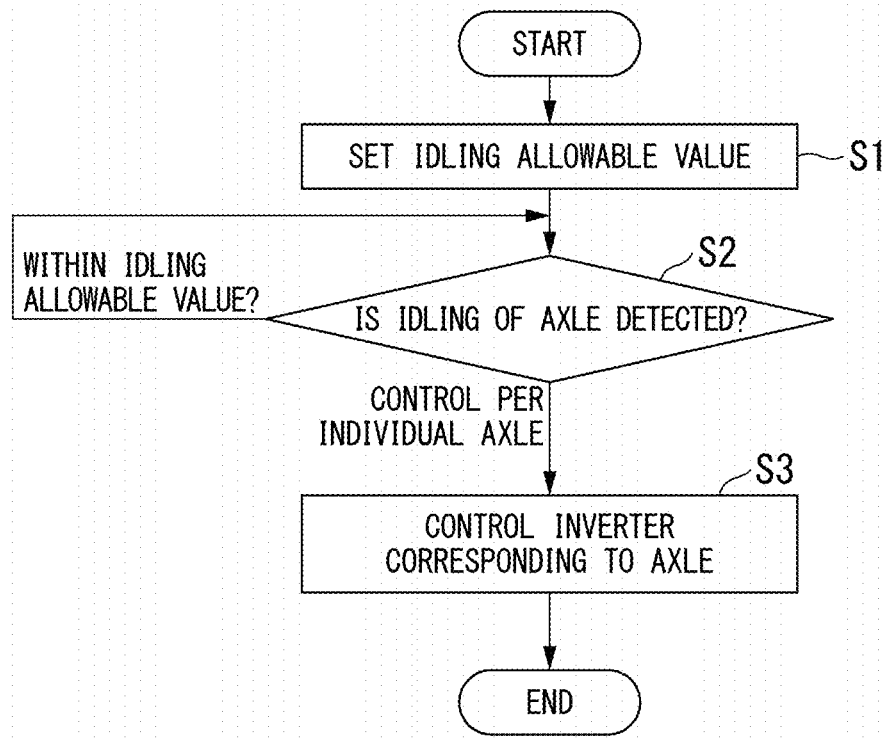
FIG. 5 is a diagram which shows an example of a processing flow of the traffic system according to the first modified example of the first embodiment.

FIG. 5 is a diagram which shows an example of a processing flow of the traffic system according to the first modified example of the first embodiment. Next, processing for improving the idling of wheels by the traffic system 1 according to the first modified example of the first embodiment will be described with reference to FIG. 5.

The traffic system 1 sets an idling allowable value (step S1). Specifically, for example, the determination unit 2153 sets and holds a range of the rate of change in the number of rotations of the wheels 202a2 per unit time determined in advance by based on the rate of change in the number of rotations of the wheels 202a1 per unit time, that is, an allowable value for the rate of change in the number of rotations. In addition, the host system 30 sets and holds an allowable value for the amount of change in the rotation speed (acceleration) of each of the motors 204a1 and 204a2 (for example, an allowable value for the amount of change in the frequency of motor current flowing through the motors 204a1 and 204a2).

The traffic system 1 detects idling of the axle (step S2). Specifically, in the electric vehicle 20, the acquisition unit 2152 acquires results of detecting the number of rotations from the rotation sensors 40a1 and 40a2. The determination unit 2153 calculates the rate of change in the number of rotations of the wheels 202a1 per unit time and the rate of change in the number of rotations of the wheels 202a2 per unit time from each result of detection acquired by the acquisition unit 2152 (that is, the rate of change in the number of rotations of the wheels 202a1 per unit time and the rate of change in the number of rotations of the wheels 202a2 per unit time), compares between these, and determines the idling of the axle on the basis of a result of the comparison. For example, when the rate of change in the number of rotations of the wheels 202a2 per unit time with respect to the rate of change in the number of rotations of the wheels 202a1 per unit time deviates from a range of the rate of change in the number of rotations of the wheels 202a2 per unit time determined in advance based on the rate of change in the number of rotations of the wheels 202a1 per unit time, that is, the allowable value of the rate of change in the number of rotations, the determination unit 2153 determines that an axle to which the wheels with the higher rate of change in the number of rotations per unit time are connected is idling. In addition, the determination unit 2153 determines that the axle is not idling when it does not deviate from the range of the rate of change in the number of rotations, that is, the allowable value of the rate of change in the number of rotations.

In addition, specifically, the host system 30 determines whether the amount of change in the frequency of both motor currents flowing through the motors 204a1 and 204a2 exceeds the allowable value, and determines that both axles (front and rear axles) are idling when it is determined that the amount of change in the frequency of both motor currents exceeds the allowable value. Moreover, when the host system 30 determines that the amount of change in the frequency of at least one of the motor currents does not exceed the allowable value, it determines that the idling of both axles has not occurred.

In processing of step S2, when the traffic system 1 determines that at least one of the front and rear axles is idling ("control for each individual axle" in step S2), an inverter corresponding to each individual axle is controlled (step S3) to reduce the torque of the wheels connected to the axle determined to be idling. Specifically, when the determination limit 2053 determines that the axle is idling, the control unit 2151 controls the inverter corresponding to each individual axle (that is, inverter 217a1 or inverter 217a2) to reduce the torque of the wheels (that is, the wheels 202a1 or 202a2) connected to the axle determined to be idling.

In addition, in the processing of step S2, when the traffic system 1 determines that it has detected the idling of both the front and rear axles, the inverter corresponding 113 to each individual axle is controlled to reduce the torque of the wheels connected to both axles. Specifically, when the host system 30 detects the idling of both axles (in the example shown here, when it is determined that the amount of change in the frequency of both motor currents flowing through the motors 204a1 and 204a2 exceeds the allowable value)), the host system 30 transmits a torque command value that narrows down current values of the motors 204a1 and 204a2 (that is, reduces torque of the motor 204a1 and the motor 204a2) determined that the amount of change in the frequency of the motor current has exceeded the allowable value to the electric vehicle 20. In this case, the control unit 2151 of the electric vehicle 20 controls each of the inverters 217a1 and 217a2 according to the torque command transmitted from the host system 30.

Also, in the processing of step S2, if the traffic system 1 determines that both axles are not idling ("within the idling allowable value" in step S2), it returns to the determination of step S2.

In the traffic system 1, when the determination unit 2053 determines that the axle is idling and the host system 30 transmits the torque command value to the electric vehicle 20, the control unit 2151 gives priority to the torque command value transmitted by the host system 30 to the electric vehicle 20 and controls the inverter corresponding to each of both axles. In other words, the traffic system 1 executes processing of step S4 with priority over processing of step S3.

(Advantage)

The traffic system 1 according to the first modified example of the first embodiment has been described above. In the traffic system 1 according to the first modified example of the first embodiment, processing of steps S2 and S4 described above makes it possible to improve the idling of wheels equivalent to the VDF inverter 205a of the electric vehicle 20a to be compared. In addition, since the improvement of wheel idling equivalent to this VDF inverter 205a can be realized by the host system 30 present in advance in the traffic system 1, an inverter of the electric vehicle 20 does not need the function of improving the idling of the wheels, such as the VDF inverter 205a, and can be a low-performance inverter. As a result, a cost reduction in the manufacturing of the electric vehicle 20 can be expected.

Moreover, in the traffic system 1 according to the first modified example of the first embodiment, it is possible to determine the idling of the front and rear axles and improve the idling of the wheels connected to the idling axle on the basis of a result of comparing rates of change in the number of rotations between the front wheel and the rear wheel, which are not provided in the electric vehicle 20a to be compared, according to the processing of steps S2 and S3 described above.

Second Modified Example of the First Embodiment

Next, the traffic system 1 according to a second modified example of the first embodiment of the present disclosure will be described. The traffic system 1 according to the second modified example of the first embodiment is a traffic system that includes a DC-DC converter in a Dual Active Bridge (DAB) method (hereinafter, referred to as a DAB circuit 216a) as a specific example of the DC-DC converter 216a, which is an insulated bidirectional DC-DC converter included in the traffic system 1 of the first embodiment. The traffic system 1 according to the second modified example of the first embodiment is a traffic system in which problems occurring at the time of controlling a general DC-DC converter in a DAB method are improved.

(Configuration of DAB Circuit)

Figure 6:
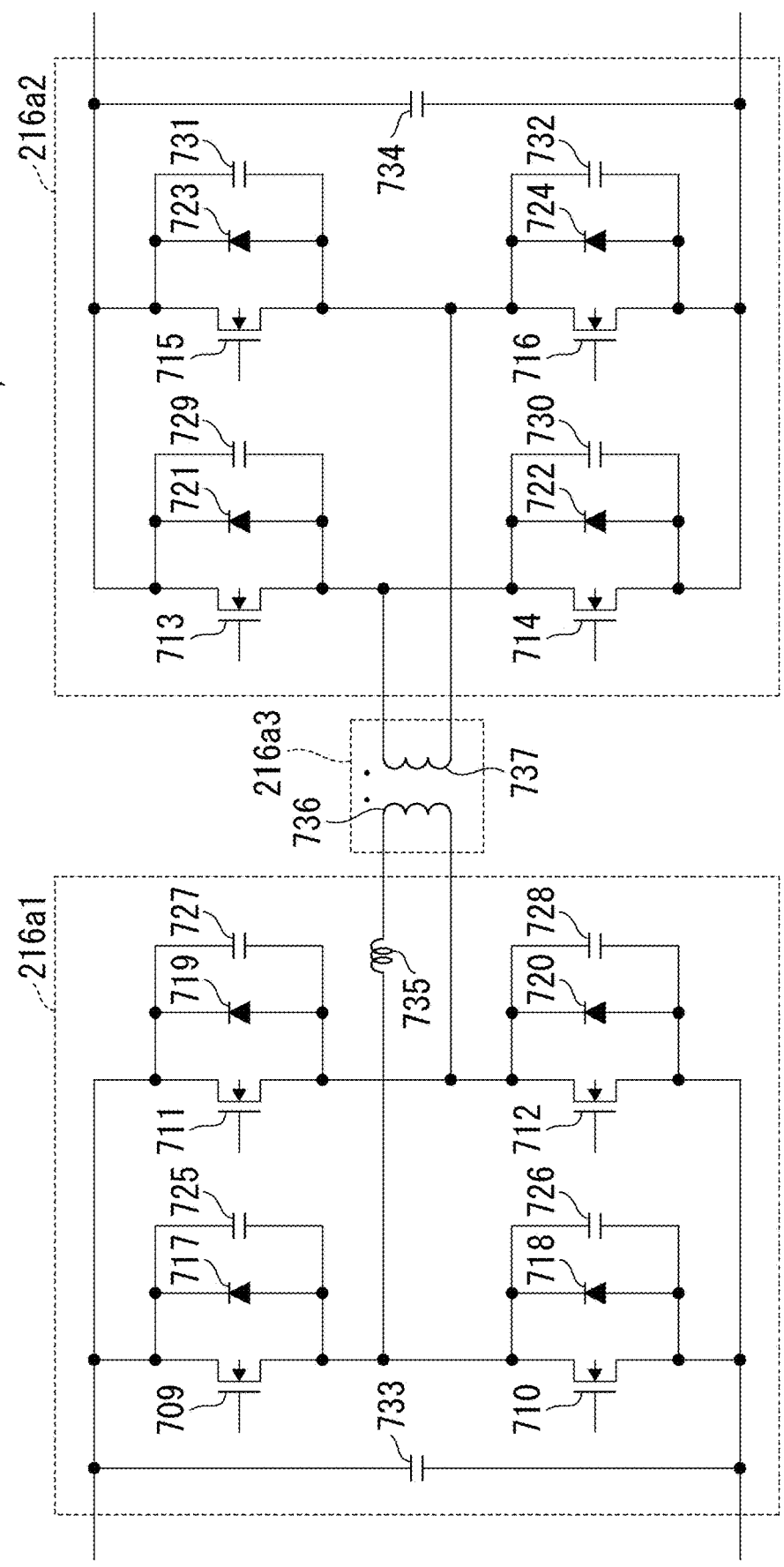
FIG. 6 is a diagram which shows an example of a configuration of a DAB circuit according to a second modified example of the first embodiment of the present disclosure.

FIG. 6 is a diagram which shows an example of a configuration of the DAB circuit 216a according to the second modified example of the first embodiment of the present disclosure. The DAB circuit 216a includes, as shown in FIG. 6, a primary side (overhead line 10 side) circuit 216a1, a secondary side (electric vehicle 20 side) circuit 216a2, and the transformer 216a3. For convenience of description, a circuit on the overhead line 10 side is called the primary circuit 216a1, and a circuit on the electric vehicle 20 side is called the secondary circuit 216a2. However, since the DAB circuit 216a is an insulated bidirectional DC-DC converter, there is no need to mention that the electric vehicle 20 side becomes the primary side and the overhead line 10 side becomes the secondary side in an actual operation, and it is also possible to transmit electric power from the electric vehicle 20 to the overhead line 10.

The primary circuit 216a1 includes, as shown in FIG. 6, four switching elements 709, 710, 711, and 712, four diodes 717, 718, 719, and 720, five capacitors 725, 726, 727, 728, and 733, and a reactor 735. The switching elements 709, 710, 711, and 712 are, for example, power semiconductors. Examples of the power semiconductors include metal oxide semiconductor (MOS) transistors, insulated gate bipolar transistors (IGBT), silicon carbide (SiC) transistors, and the like.

For example, if the switching elements 709, 710, 711, and 712 are MOS transistors, the diode 717 is a body diode of the switching element 709 (that is, a parasitic diode between source and drain). Moreover, the diodes 718, 719 and 720 are body diodes of the switching elements 710, 711 and 712, respectively. The capacitors 725, 726, 727 and 728 are snubber capacitors.

In addition, the secondary circuit 216a2 includes, as shown in FIG. 6, four switching elements 713, 714, 715, and 716, four diodes 721, 722, 723, and 724, and five capacitors 729, 730, 731, 732, and 734. The switching elements 713, 714, 715, and 716 are, for example, power semiconductors. The switching elements 713, 714, 715, and 716 may be different types of power semiconductors from the switching elements 709, 710, 711, and 712. For example, the switching elements 709, 710, 711, 712 may be IGBTs and the switching elements 713, 714, 715, 716 may be MOS transistors.

For example, if the switching elements 713, 714, 715, and 716 are MOS transistors, the diode 721 is a body diode of the switching element 713. The diodes 722, 723 and 724 are body diodes of the switching elements 714, 715 and 716, respectively. The capacitors 729, 730, 731 and 732 are snubber capacitors.

The transformer 216a3 includes, as shown in FIG. 6, a primary coil 736 and a secondary coil 737.

Connection between elements of the DAB circuit 216a shown in FIG. 6 is the same as connection of a general DAB type DC-DC converter. In the traffic system 1 according to the second modified example of the first embodiment, the switching elements 709, 710, 711, 712, 713, 714, 715, and 716 are controlled such that they are in the ON state or the OFF state by the control unit 2151 of the control circuit 215. In the traffic system 1 according to the second modified example of the first embodiment, control of the switching elements 709, 710, 711, 712, 713, 714, 715, and 716 by the control unit 2151 is different from general control performed on the DAB type DC-DC converter.

Figure 7B:
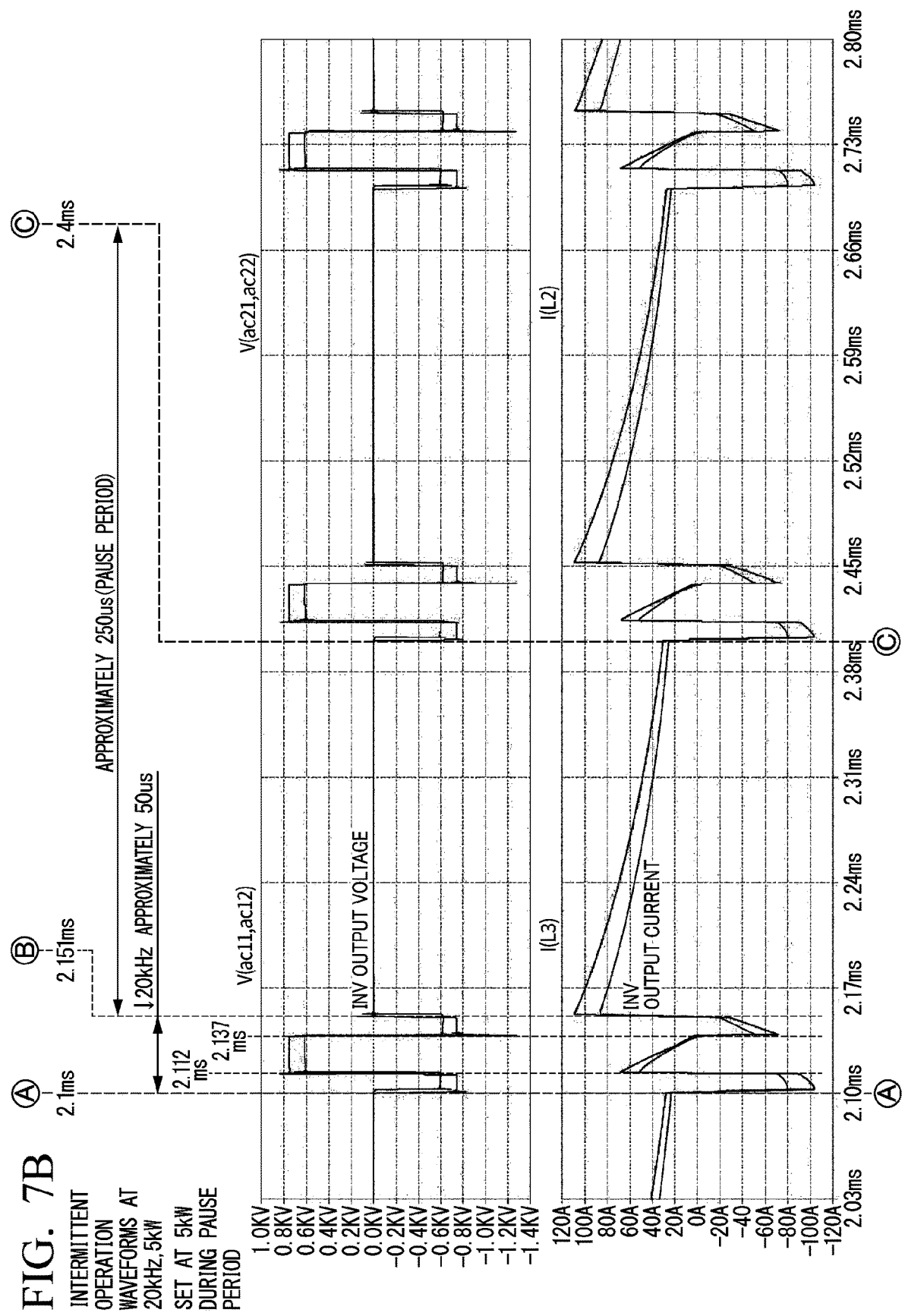
FIG. 7B is a second diagram for describing problems that occur when a DC-DC converter of a general DAB type is controlled.
Figure 8:
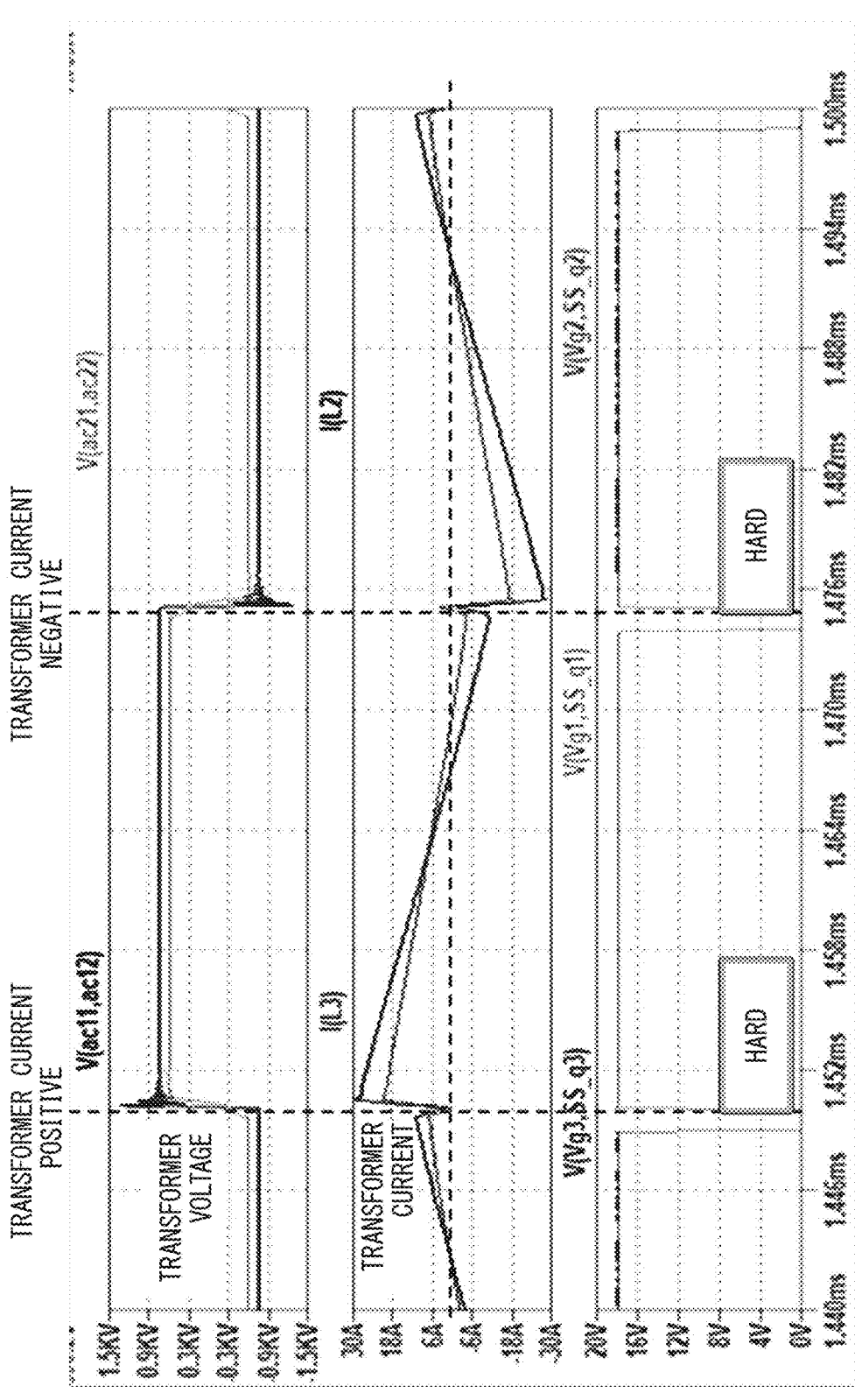
FIG. 8 is a fourth diagram for describing the problems that occur when the DC-DC converter of the general DAB type is controlled.
Figure 9:
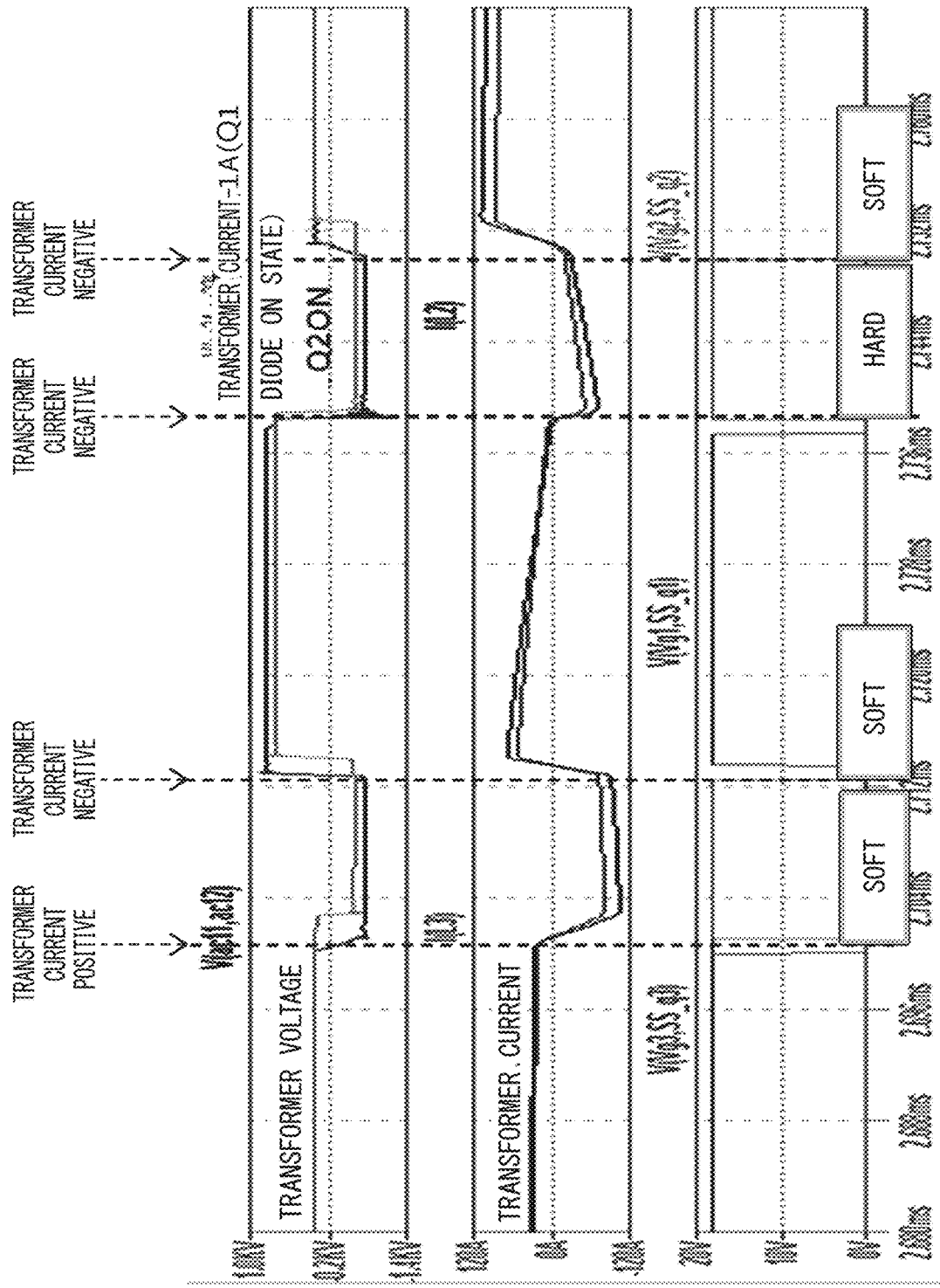
FIG. 9 is a fifth diagram for describing the problems that occur when the DC-DC converter of the general DAB type is controlled.

Here, problems that occur at the time of controlling a general DAB type DC-DC converter will be described. FIG. 7A is a first diagram for describing problems that occur at the time of controlling the general DAB type DC-DC converter. FIG. 7B is a second diagram for describing problems that occur at the time of controlling the general DAB type DC-DC converter. FIG. 7C is a third diagram for describing problems that occur at the time of controlling the general DAB type DC-DC converter. FIG. 8 is a fourth diagram for describing problems that occur at the time of controlling the general DAB type DC-DC converter. FIG. 9 is a fifth diagram for describing problems that occur at the time of controlling the general DAB type DC-DC converter. FIG. 8 is an enlarged view of FIG. 7A. Moreover, FIG. 9 is an enlarged view of a part including one cycle in which an operation is performed in FIG. 7B.

The FIG. 7A is a diagram which shows a result of simulation when the control unit 2151 switches the switching elements 709, 710, 711 and 712 of the DAB circuit 216a using a signal of a constant cycle (in the example shown here, a constant cycle of 20 kHz)) with a duty ratio of 50%, and transmits 5 kW of electric power from the primary circuit 216a1 to the secondary circuit 216a2. When electric power is transmitted from the primary circuit 216a1 to the secondary circuit 216a2, the switching elements 713, 714, 715, and 716 of the secondary circuit 216a2 are in the OFF state, and the bridge circuit configured from the diodes 721 to 724 rectifies a voltage transmitted from the primary circuit 216a1 to the secondary circuit 216a2 via the transformer 216a3. In addition, an input voltage of the primary circuit 216a1 is 800 volts, an output voltage of the secondary circuit 216a2 is 500 volts, and a dead time is provided for the switching of the switching elements to prevent the switching element 709 and the switching element 710 connected in series up and down from being in the ON state at the same time, in addition, to prevent the switching element 711 and the switching element 712 from being in the ON state at the same time (that is, to prevent the through current from flowing).

Control that switches the switching elements using a signal of the constant cycle with a duty ratio of 50% is one of control commonly performed. When the control unit 2151 performs control of switching the switching elements using a signal of the constant cycle with a duty ratio of 50% on a general DAB type DC-DC converter, since a dead time is provided even when, for example, it is controlled that the switching elements 709 and 712 are in the ON state and the switching elements 710 and 711 are in the OFF state, there is a state in which both the switching elements 709 and 710 are in the OFF state. However, even if the switching element 710 is in the OFF state, current flows through a path of the diode 718, the reactor 735, the primary coil 736, and the switching element 712 via the diode 718. In this state, when dead time ends and the switching element 709 is turned on, a phenomenon called recovery occurs in which a voltage substantially equal to the input voltage of the primary circuit 216a1 due to the DC voltage of the overhead line 10 is applied to the diode 718, and current flows in the diode 718 in an opposite direction. In this case, the switching element 710 is also turned on, and a problem occurs that a through current flows from the switching element 709 to the switching element 710 (that is, hard switching). When the control unit 2151 performs the control of switching the switching elements using a signal of the constant cycle with a duty ratio of 50%, a phenomenon called recovery occurs every half cycle. A cause of the phenomenon called recovery occurring when the control unit 2151 performs the control of switching the switching elements using a signal of the constant cycle with a duty ratio of 50% is because, as shown in FIG. 8, the transformer current changes from a positive current to a negative current and crosses zero in a period in which the transformer voltage is kept at the high level, and the transformer current changes from a negative current to a positive current and crosses zero in a period in which the transformer voltage is kept at the low level. When the input voltage of the primary circuit 216a1 and the output voltage of the secondary circuit 216a2 are equal, there is almost no change in the transformer current and no zero crossing, so the phenomenon called recovery does not occur.

A driving method called an intermittent operation has been proposed to prevent the phenomenon called recovery described above. This intermittent operation is control of switching the switching elements before the transformer current described above changes and crosses zero. In FIG. 7B, the high level and the low level are switched before the transformer current crosses zero by changing the period in which the transformer voltage is kept at the high level and the period in which the transformer voltage is kept at the low level without changing the constant cycle (in this case, 20 kHz). However, since electric power transmitted from the primary circuit 216a1 to the secondary circuit 216a2 needs to be the same as that before the change (in the example shown here, it needs to be 5 kW), the electric power to be transmitted is adjusted by providing a period in which the transformer voltage is zero. However, when the intermittent operation is performed without changing the constant cycle (20 kHz in this case) hard switching may occur as shown in FIG. 9, that is, the phenomenon called recovery cannot be completely eliminated.

Therefore, in the traffic system 1 according to the second modified example of the first embodiment, the constant cycle is shortened (for example, 40 kHz corresponding to half the cycle), and a period is provided to make the transformer voltage zero such that the electric power transmitted from the primary circuit 216a1 to the secondary circuit 216a2 becomes the same as before the change. The control unit 2151 controls the switching elements 709, 710, 711, and 712 of the DAB circuit 216a with such signals, thereby preventing hard switching, that is, eliminating the phenomenon called recovery. FIG. 7C shows an example of signals used when the control unit 2151 controls the switching elements 709, 710, 711 and 712 of the DAB circuit 216a. As shown in FIG. 7C, as described above, the control unit 2151 controls the switching elements 709, 710, 711, 712 of the DAB circuit 216a by shortening the constant cycle (for example, 40 kHz corresponding to half the period), and using a signal with a period provided to make the transformer voltage zero such that the electric power transmitted from the primary circuit 216a1 to the secondary circuit 216a2 becomes the same as before the change. As a result, it is possible to switch between a high level and a low level before the transformer current crosses zero, and it is possible to prevent hard switching, that is, to eliminate the phenomenon called recovery. In general, when the constant cycle is shortened, a frequency is increased, that is, the number of switching times increases, so an efficiency tends to decrease due to heat generation caused by switching. However, in the traffic system 1 according to the second modified example of the first embodiment, even if the constant cycle is shortened, the pause period is set accordingly, and the number of switching times per cycle can be made to be equal to or less than before the constant cycle is shortened. For this reason, in the traffic system 1 according to the second modified example of the first embodiment, it is possible to improve efficiency.

When the load of the DC-DC converter 216a is light, such as when the air conditioner is stopped in the electric vehicle 20, the transformer current is decreased. When the transformer current is small, if the transformer current changes due to something such as noise, a ratio of the change to the transformer current is increased, and negligible change in the transformer current cannot be neglected when the transformer current is large. That is, when the transformer current is small, a phenomenon called recovery may occur in the same manner as when the transformer current changes and the input voltage of the primary circuit 216a1 is different from the output voltage of the secondary circuit 216a2. Therefore, when the transformer current is small, in the same manner as when the input voltage of the primary circuit 216a1 is different from the output voltage of the secondary circuit 216a2, the control unit 2151 may shorten the constant cycle, set a pause period such that the electric power transmitted per unit time becomes desired electric power, and control the switching elements 709, 710, 711, and 712 of the DAB circuit 216a.

When the input voltage of the primary circuit 216a1 and the output voltage of the secondary circuit 216a2 are considered to be the same, or when the load is considered to be heavy; the control unit 2151 may perform control such that the switching elements 709, 710, 711 and 712 are switched by a signal having a constant cycle (in the example shown here, a constant cycle of 20 kHz) with a duty ratio of 50% shown in FIG. 7A.

In addition, when transmitting electric power from the electric vehicle 20 to the overhead line 10 (for example, when the electric vehicle 20 applies an electric brake and regenerative electric power is generated in the electric vehicle 20), when the voltage of the electric power generated on the electric vehicle 20 side (an example of a third voltage) is different from a voltage of the overhead line 10 (an example of the first voltage), or when the load of the overhead line 10 is light, the control unit 2151 may turn off the switching elements 709, 710, 711, and 712, and control the switching elements 713, 714, 715, and 716 in the same manner as the switching elements 709, 710, 711, and 712 described above, (Advantage)

The traffic system 1 according to the second modified example of the first embodiment has been described above. The control unit 2151 shortens a cycle of switching the switching elements 709, 710, 711 and 712 and provides a period in which the switching is not performed when an input voltage (an example of a first voltage) of the primary circuit 216a1 is different from an output voltage (an example of a second voltage) of the secondary circuit 216a2, or when a load of the DC-DC converter 216a in the electric vehicle 20 is light. In addition, when a voltage of electric power generated on the electric vehicle 20 side (an example of the third voltage) is different from the voltage of the overhead line 10 (an example of the first voltage), or when the load of the overhead line 10 is light, the control unit 2151 shortens a cycle of switching the switching elements 713, 714, 715 and 716 and provides the period in which the switching is not performed. By configuring the DC-DC converter 216a of the traffic system 1 in this manner, it is possible to suppress occurrence of hard switching.

Third Modified Example of First Embodiment

Next, a traffic system 1 according to a third modified example of the first embodiment of the present disclosure will be described. The traffic system 1 according to the third modified example of the first embodiment is a traffic system that reduces a possibility that malfunction occurs in electronic components of the DAB circuit 216a when the DAB circuit 216a included in the traffic system 1 according to the second modified example of the first embodiment is started, and performs charging of the capacitor 734 provided in the secondary circuit 216a2.
(Configuration of Traffic System)

The configuration of the DAB circuit 216a according to the third modified example of the first embodiment is the same as the configuration of the DAB circuit 216a according to the second modified example of the first embodiment shown in FIG. 6. The traffic system 1 according to the third modified example of the first embodiment differs from the traffic system 1 according to the second modified example of the first embodiment in the content of control over the switching elements 709, 710, 711, and 712 by the control unit 2151.

Figure 10:
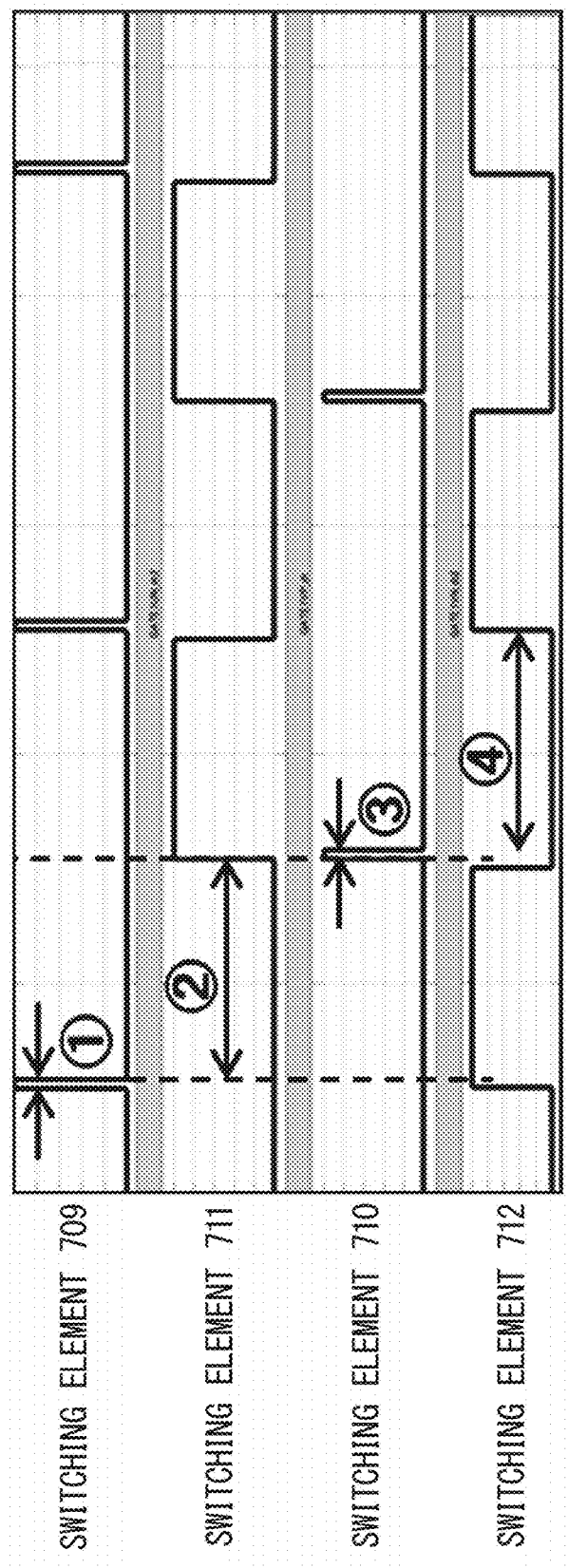
FIG. 10 is a first diagram for describing control content of a control unit according to a third modified example of the first embodiment.
Figure 11:
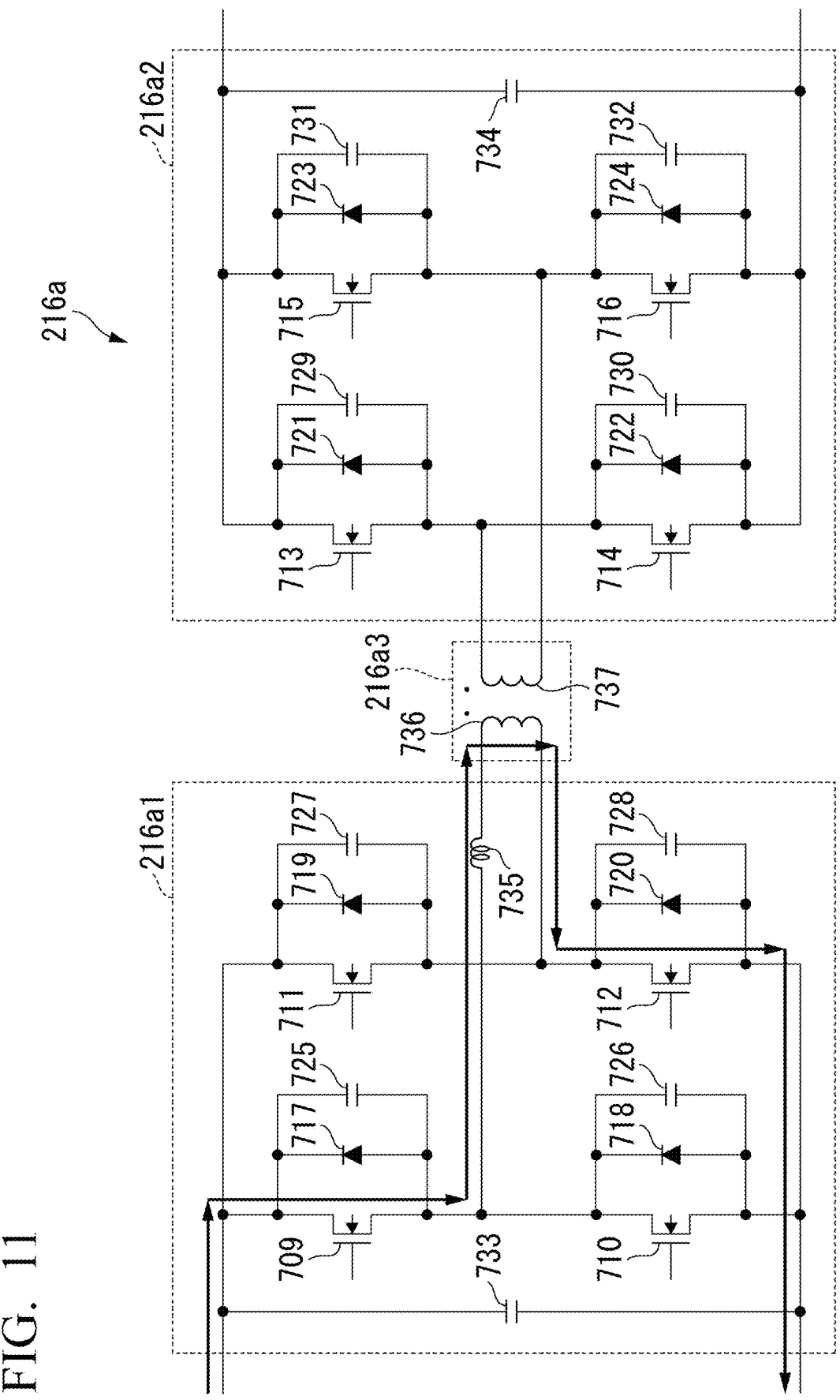
FIG. 11 is a second diagram for describing the control content of the control unit according to the third modified example of the first embodiment.
Figure 12:
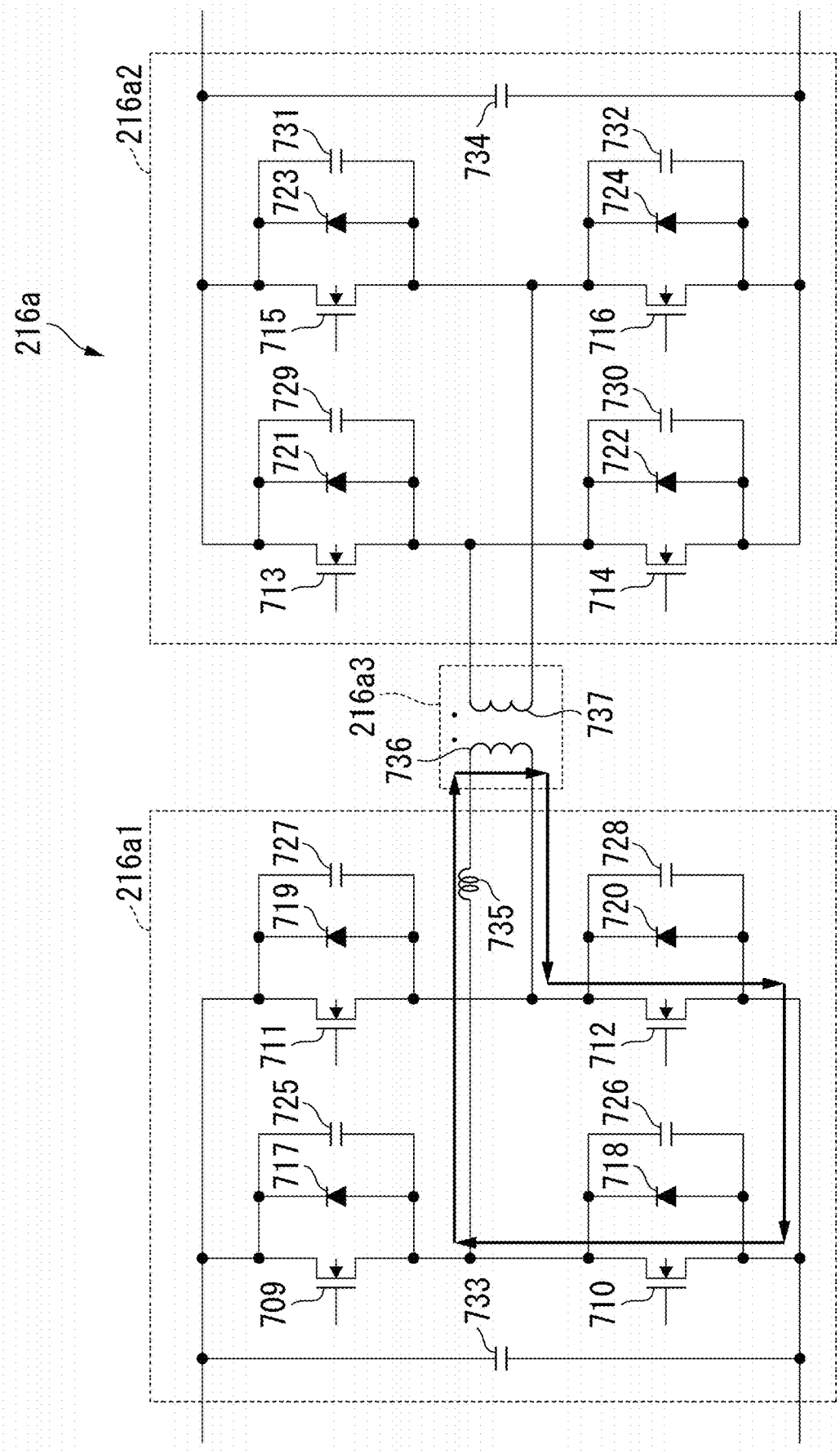
FIG. 12 is a third diagram for describing the control content of the control unit according to the third modified example of the first embodiment.
Figure 13:
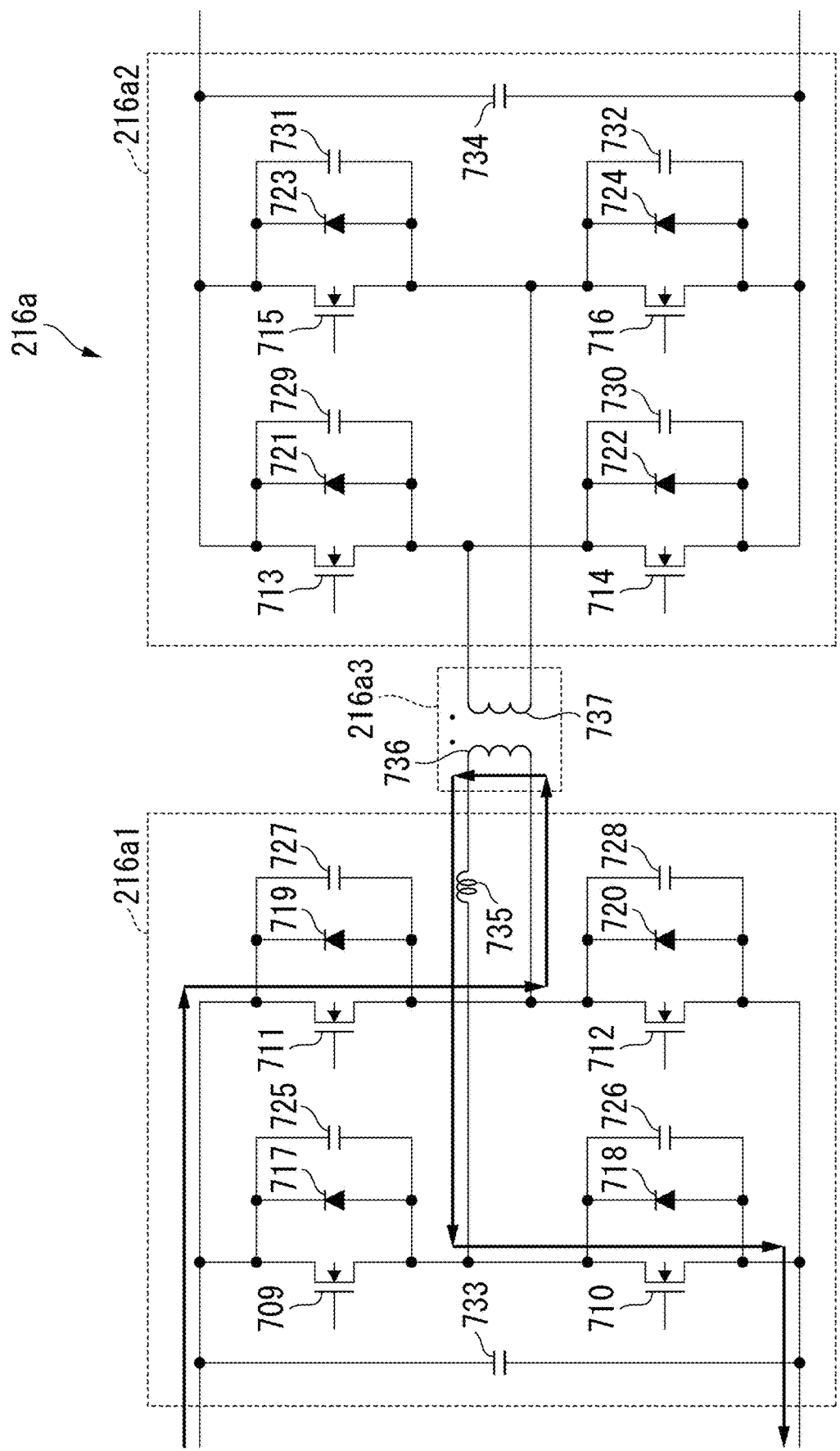
FIG. 13 is a fourth diagram for describing the control content of the control unit according to the third modified example of the first embodiment.
Figure 14:
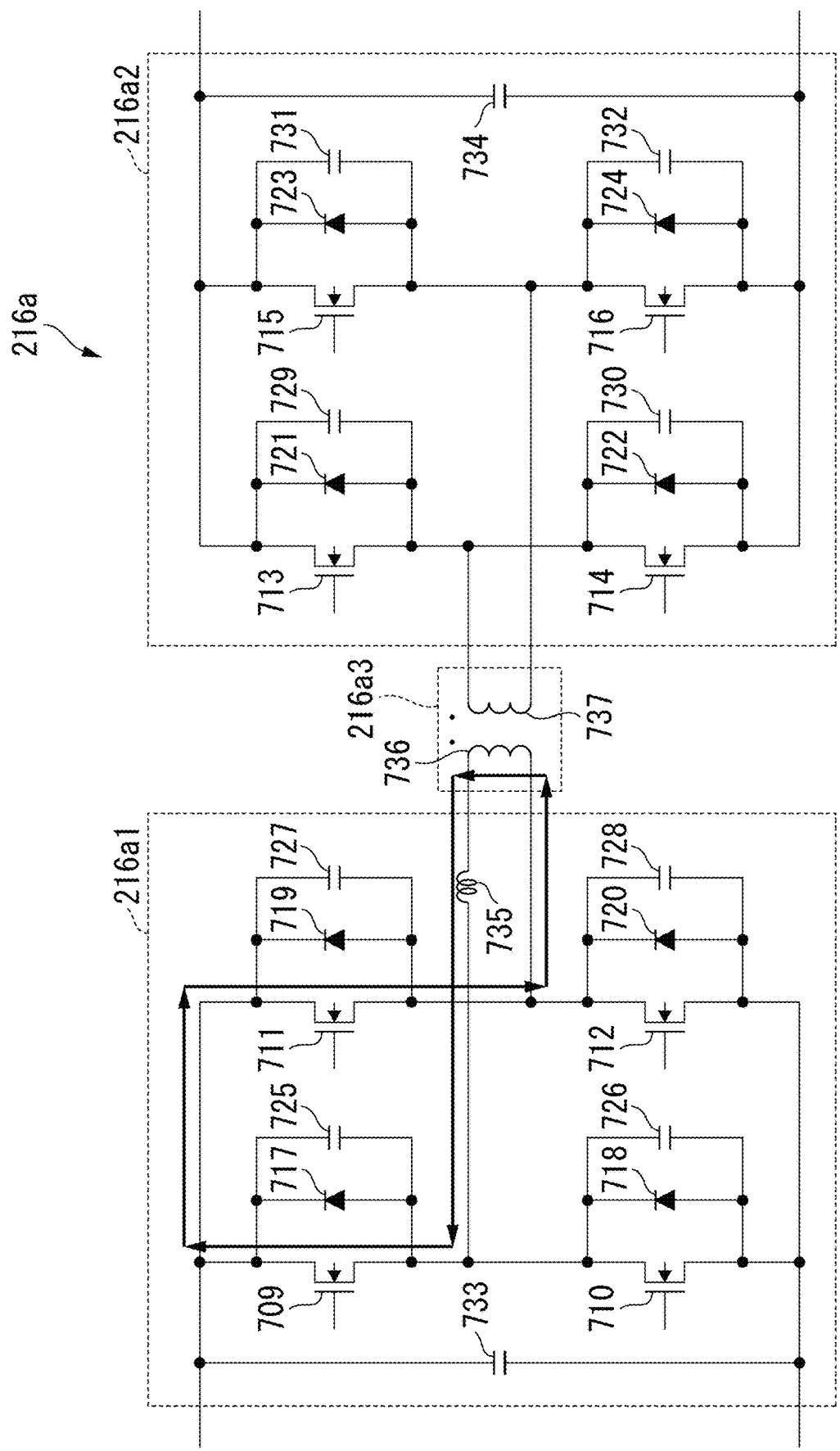
FIG. 14 is a fifth diagram for describing the control content of the control unit according to the third modified example of the first embodiment.

FIG. 10 is the first diagram for describing control content of the control unit 2151 according to the third modified example of the first embodiment. FIG. 11 is a second diagram for describing the control content of the control unit 2151 according to the third modified example of the first embodiment. FIG. 12 is a third diagram for describing the control content of the control unit 2151 according to the third modified example of the first embodiment. FIG. 13 is a fourth diagram for describing the control content of the control unit 2151 according to the third modified example of the first embodiment. FIG. 14 is a fifth diagram for describing the control content of the control unit 2151 according to the third modified example of the first embodiment.

FIG. 10 is a diagram which shows an example of control signals used when the control unit 2151 switches the switching elements 709, 710, 711, and 712. FIG. 11 shows a current path in the DAB circuit 216a in a period indicated as 1 in FIG. 10. In the period indicated as 1 in FIG. 10, the control unit 2151 controls the switching elements 709 and 712 such that they are in the ON state and controls the switching elements 710 and 711 such that they are in the OFF state. In the period indicated as 1 in FIG. 10, current flows through a path of the overhead line 10, the switching element 709, the reactor 735, the primary coil 736, the switching element 712, and the overhead line 10, as shown in FIG. 11.

FIG. 12 shows the current path in the DAB circuit 216a in a period indicated as 2 in FIG. 10. In the period indicated as 2 in FIG. 10, the control unit 2151 controls the switching element 712 such that it is in the ON state and controls the switching elements 709, 710, and 711 such that they are in the OFF state. In the period indicated as 2 in FIG. 10, current flows through a path of the reactor 735, the primary coil 736, the switching element 712, and the diode 718, as shown in FIG. 12.

FIG. 13 shows the current path in the DAB circuit 216a in a period indicated as 3 in FIG. 10. In the period indicated as 3 in FIG. 10, the control unit 2151 controls the switching elements 710 and 711 such that they are in the ON state and controls the switching elements 709 and 712 such that they are in the OFF state. In the period indicated as 3 in FIG. 10, current flows through a path of the overhead line 10, the switching element 711, the primary coil 736, the reactor 735, the switching element 710, and the overhead line 10, as shown in FIG. 13.

FIG. 14 shows the current path in the DAB circuit 216a in the period indicated as 4 in FIG. 10. In the period indicated as 4 in FIG. 10, the control unit 2151 controls the switching element 711 such that it is in the ON state and controls the switching elements 709, 710, and 712 such that they are in the OFF state. In the period indicated as 4 in FIG. 10, current flows through a path of the switching element 711, the primary coil 736, the reactor 735, and the diode 717, as shown in FIG. 14.

When the DAB circuit 216a is started, the periods indicated as 1 to 4 in FIG. 10 are repeated, and the current flows through the paths shown in FIGS. 11 to 14 repeatedly. In this case, current flowing through the reactor 735 changes the direction, that is, alternating current flows through the reactor 735. This alternating current is transmitted to the second circuit 216a2 via the transformer 216a3 and rectified by a bridge circuit of the diodes 721 to 724. As a result, the capacitor 734 is charged. As shown in FIG. 10, the period in which the switching element 709 and the switching element 710 are in the ON state is shorter than the period in which the switching element 711 and the switching element 712 are in the ON state. For this reason, the capacitor 734 repeats being slightly charged in a short time. That is, a possibility that the capacitor 734 is charged with excessive current is reduced.

Note that the control unit 2151 may lengthen the period in which the switching element 709 and the switching element 710 are in the ON state similar to the period in which the switching element 711 and the switching element 712 are in the ON state when the charge of the capacitor 734 reaches a predetermined state (for example, when it is determined that the charge reaches 80% of the full charge).

Figure 15:
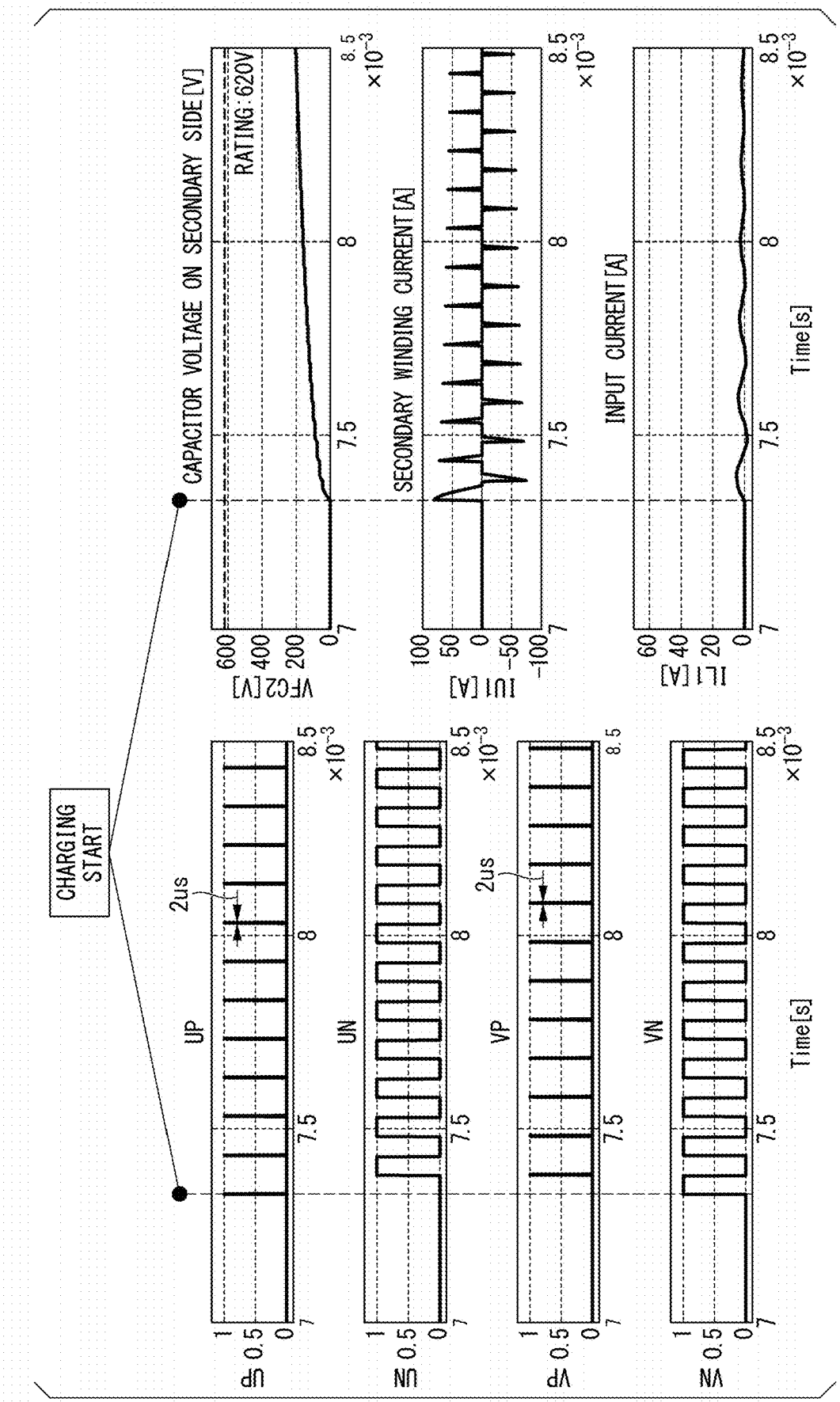
FIG. 15 is a first diagram which shows an example of waveforms of simulation of charging a capacitor according to the third modified example of the first embodiment.
Figure 16:
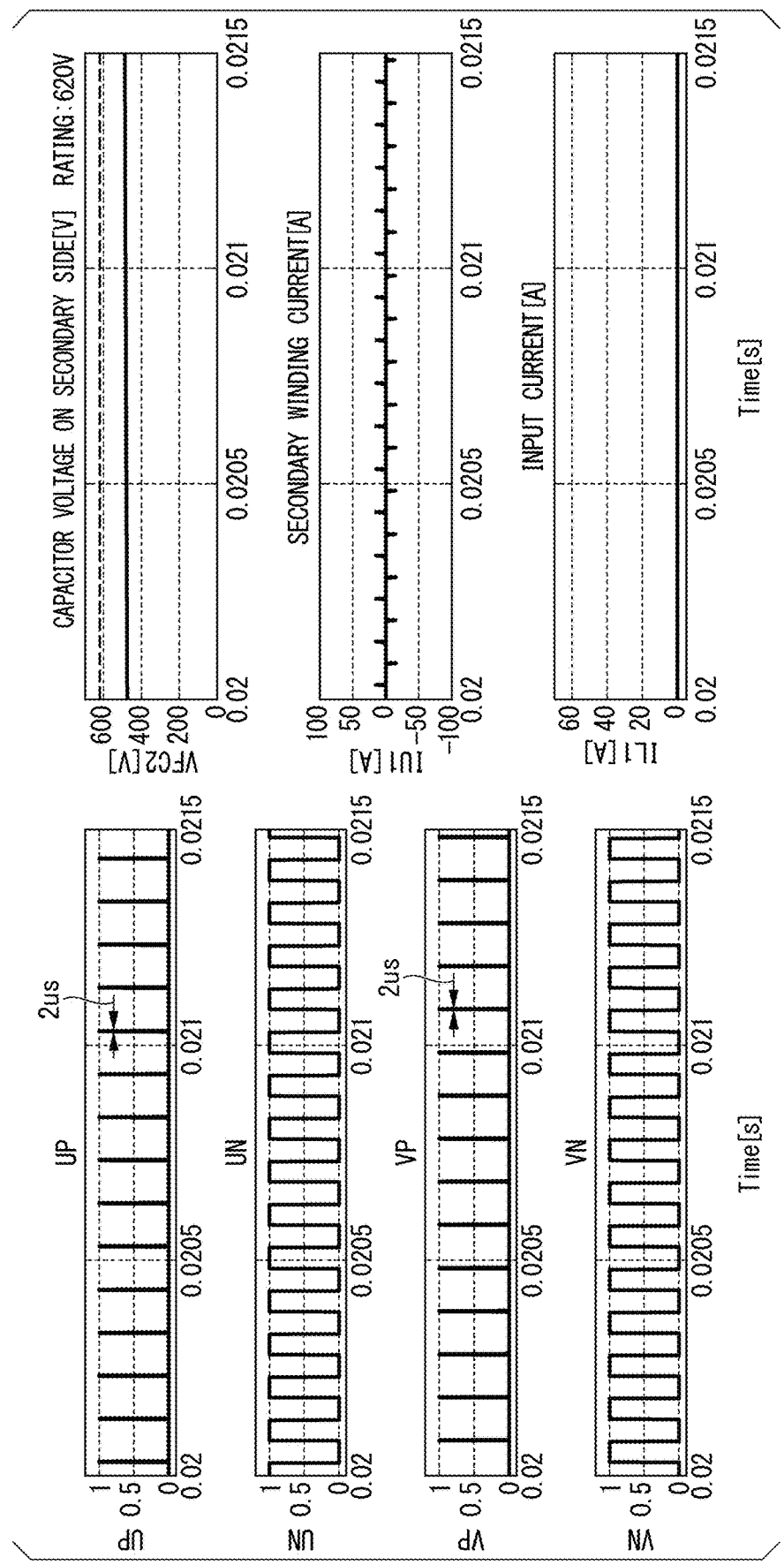
FIG. 16 is a second diagram which shows an example of waveforms of a simulation of charging the capacitor according to the third modified example of the first embodiment.
Figure 17:
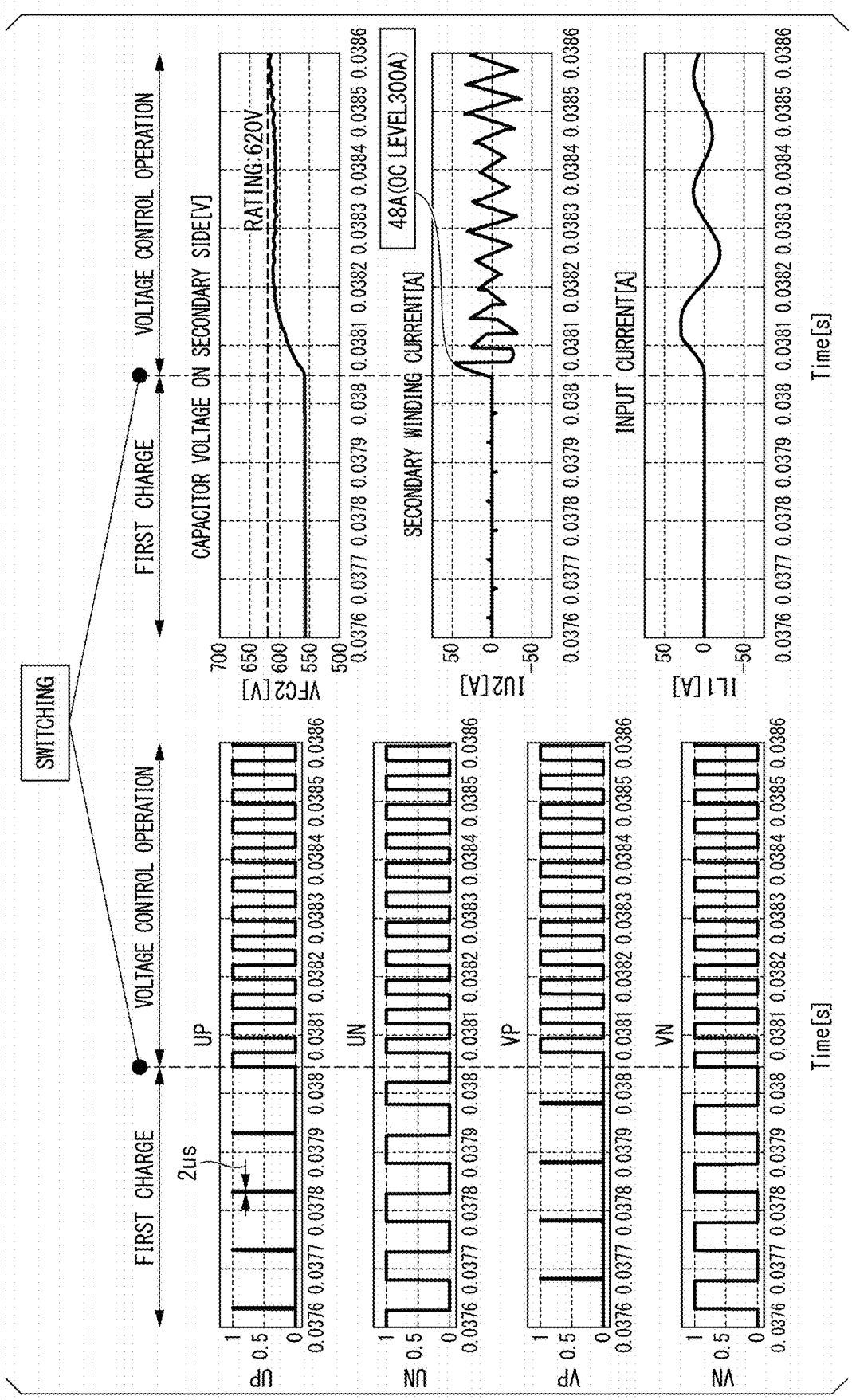
FIG. 17 is a third diagram which shows an example of waveforms of a simulation of charging the capacitor according to the third modified example of the first embodiment.

FIG. 15 is a first diagram which shows an example of waveforms of simulation for charging the capacitor 734. FIG. 16 is a second diagram which shows an example of the waveforms of the simulation fir charging the capacitor 734. FIG. 17 is a third diagram which shows an example of the waveforms of the simulation for charging the capacitor 734.

FIG. 15 shows an example of the waveforms of the simulation when charging of the capacitor 734 starts. Based on the waveforms shown in FIG. 15, it can be seen that a voltage of the capacitor 734 rises slowly.

FIG. 16 shows an example of the waveforms of the simulation in the middle of charging the capacitor 734. Based on the waveforms shown in FIG. 16, it can be seen that a change in voltage of the capacitor 734 rises more slowly than when the charging starts.

FIG. 17 shows an example of waveforms of simulation when the capacitor 734 is charged to a predetermined state (in this example, a state in which it is charged to 80% of the full charge) and the control unit 2151 lengthens a period in which the switching elements 709 and 710 are in the ON state similarly to a period in which the switching element 711 and the switching element 712 are in the ON state. Based on the waveforms shown in FIG. 17, it can be seen that a voltage of the voltage of the capacitor 734 rises quickly from a timing when the control unit 2151 lengthens the period in which the switching element 709 and the switching element 710 are in the ON state similar to the period in which the switching element 711 and the switching element 712 are in the ON state.

When electric power is transmitted from the electric vehicle 20 to the overhead line 10 (for example, when the electric vehicle 20 applies an electric brake and regenerative electric power is generated in the electric vehicle 20), the control unit 2151 may turn off the switching elements 709, 710, 711 and 712, and control the switching elements 713, 714, 715 and 716 in the same manner as the switching elements 709, 710, 711 and 712 described above.

(Advantage)

The traffic system 1 according to the third modified example of the first embodiment has been described above. In the traffic system 1 according to the third modified example of the first embodiment, the control unit 2151 can get the capacitor 734 to be charged without overcurrent flowing through the capacitor 734 by making a period in which some switching elements (for example, switching element 709 and switching element 710) are in the ON state shorter than a period in which other switching elements (for example, the switching element 711 and the switching element 712) are in the ON state and switching these switching elements.

Second Embodiment

Figure 18:
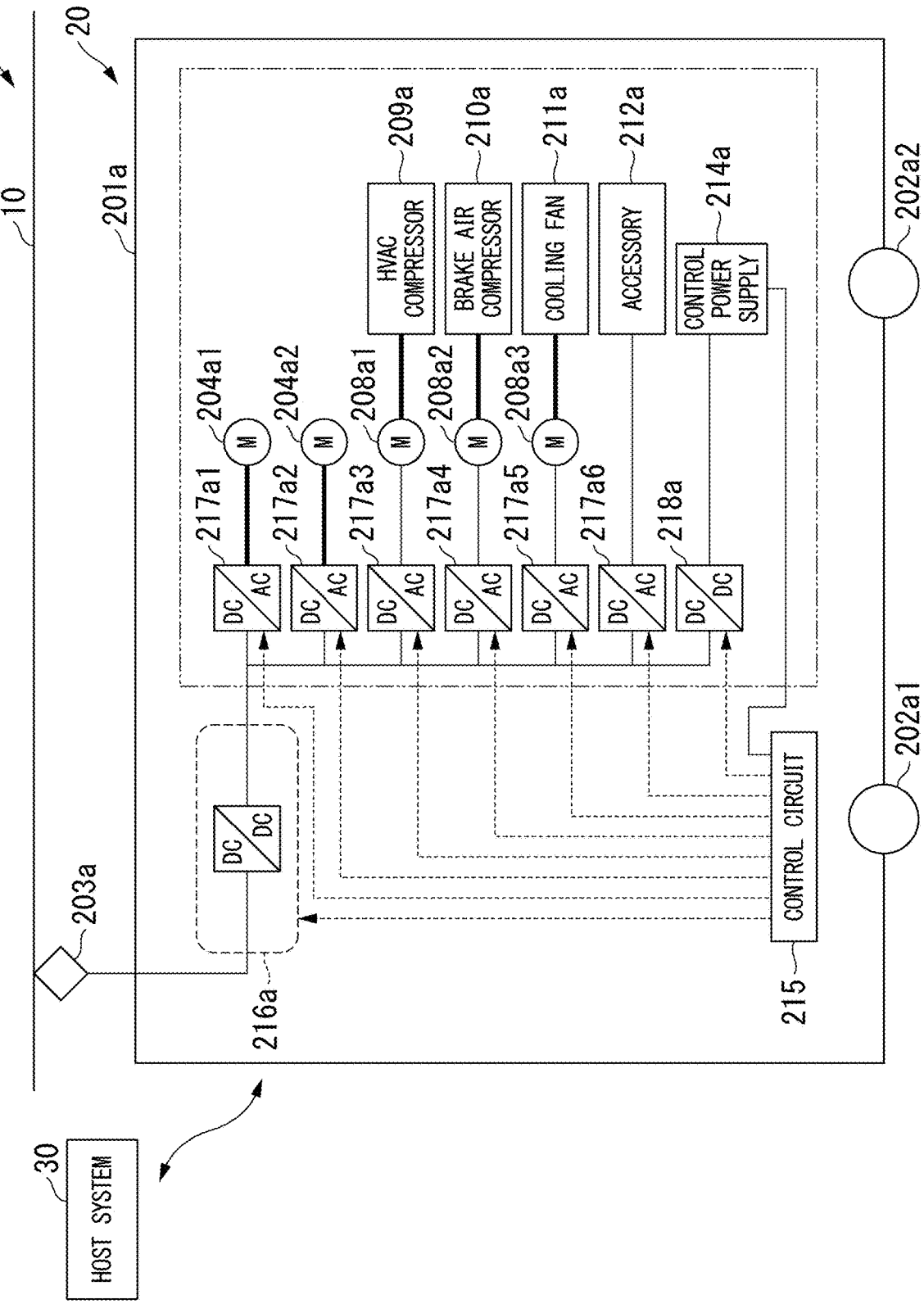
FIG. 18 is a diagram which shows an example of a configuration of a traffic system according to a second embodiment of the present disclosure.

Next, a traffic system 1 according to a second embodiment of the present disclosure will be described. FIG. 18 is a diagram which shows an example of a configuration of the traffic system 1 according to the second embodiment of the present disclosure. Unlike the traffic system 1 according to the first embodiment, the DC-DC converter 216a in the traffic system 1 according to the second embodiment of the present disclosure is a bidirectional DC-DC converter under chopper control. In the DC-DC converter 216a, a circuit handling the voltage of the overhead line 10 is configured from the electronic components with a high withstand voltage (for example, 1700 volts). In addition, in the DC-DC converter 216a, a circuit that handles a voltage supplied to the electric vehicle 20 or a voltage generated in the electric vehicle 20 (for example, a voltage indicated by the regenerative electric power) is configured from electronic components with a low withstand voltage (for example, 1200 volts). Chopper control for the switching element in the DC-DC converter 216a may be performed by the control circuit 215.

Figure 19:
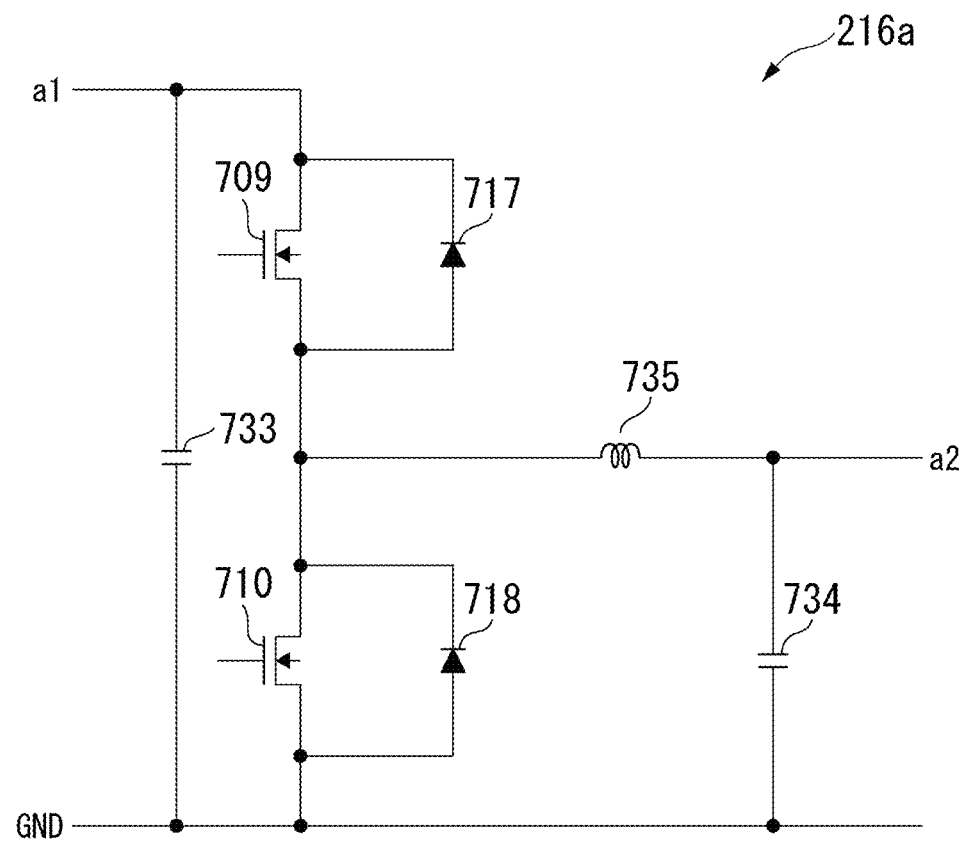
FIG. 19 is a diagram which shows an example of a configuration of a DC-DC converter according to the second embodiment of the present disclosure.

The DC-DC converter 216a according to the second embodiment is, for example, a bidirectional chopper circuit. FIG. 19 is a diagram which shows an example of a configuration of the DC-DC converter 216a according to the second embodiment of the present disclosure. The DC-DC converter 216a includes, as shown in FIG. 19, the switching elements 709 and 710, the capacitors 733 and 734, and the reactor 735. Note that the DC-DC converter 216a shown in FIG. 19 has the same configuration as a bidirectional chopper circuit with a general configuration shown in FIG. 4 of Japanese Unexamined Patent Application, First Publication No. 2006-006061.

The switching elements 709 and 710 are, for example, power semiconductors. For example, if the switching elements 709 and 710 are MOS transistors, the diode 717 is the body diode of the switching element 709. In addition, diode 718 is the body diode of the switching element 710. The DC-DC converter 216a shown in FIG. 19 can step down a voltage between a ground GND terminal on the left and a terminal a1 and output it as a voltage tween a ground GND terminal on the right and a terminal a2. In addition, the DC-DC converter 216a shown in FIG. 19 can step up the voltage between the ground GND terminal on the right side and the terminal a2 and output it as the voltage between the ground GND terminal on the left side and the terminal a1. In the case of the DC-DC converter 216a shown in FIG. 19, the switching elements 709 and 710, the capacitor 733, and the reactor 735 are electronic components with a high withstand voltage (for example, 1700 volts) that constitute the circuit handling the voltage of the overhead line 10. In addition, in the case of the DC-DC converter 216a shown in FIG. 19, the capacitor 734 is an electronic component with a low withstand voltage (for example, 1200 volts) that constitutes a circuit handling the voltage generated in the electric vehicle 20.

In addition, the DC-DC converter 216a is not limited to a bidirectional chopper circuit shown in FIG. 19, and may be any kind of DC-DC converter as long as it can convert a voltage on the overhead line 10 side into a voltage on the electric vehicle 20 side when electric power is supplied from the overhead line 10 to the electric vehicle 20, and convert and transmit regenerative electric power generated in the electric vehicle 20 from the voltage on the electric vehicle 20 side to the voltage on the overhead line 10 side, for example, when an electric brake is applied.

(Advantage)

The traffic system 1 according to the second embodiment has been described above. In the DC-DC converter 216a of the traffic system 1 according to the second embodiment, a circuit handling the voltage of the overhead line 10 is configured from electronic components with a high withstand voltage (for example, 1700 volts). In addition, the circuit that handles a voltage supplied to the electric vehicle 20 or a voltage generated in the electric vehicle 20 (for example, a voltage indicated by regenerative electric power) is configured from electronic components with a low withstand voltage (for example, 1200 volts). By configuring the DC-DC converter 216a of the traffic system 1 in this manner, even if an electric component including a high withstand voltage electronic component is replaced with an electric component including an electronic component with a lower withstand voltage than the electric component, it is possible to realize the same function as when the high withstand voltage electric component is used.

The order of processing in the embodiments of the present disclosure may be changed as long as appropriate processing is performed.

Each of the storage units and storage devices (including registers and latches) in the embodiments of the present disclosure may be provided anywhere in a range in which appropriate information transmission and reception are performed. Further, each of the storage units and storage devices may exist in a plurality and store data in a distributed manner in the range in which appropriate information transmission and reception are performed.

Although the embodiments of the present disclosure have been described, the electric vehicle 20, the control circuit 215, the control unit 2151, the host system 30, and other control devices may have a computer system inside. Then, processes of the processing described above are stored in a computer-readable recording medium in the form of a program, and the processing is performed by reading and executing this program by a computer. A concrete example of the computer is shown below.

Figure 20:
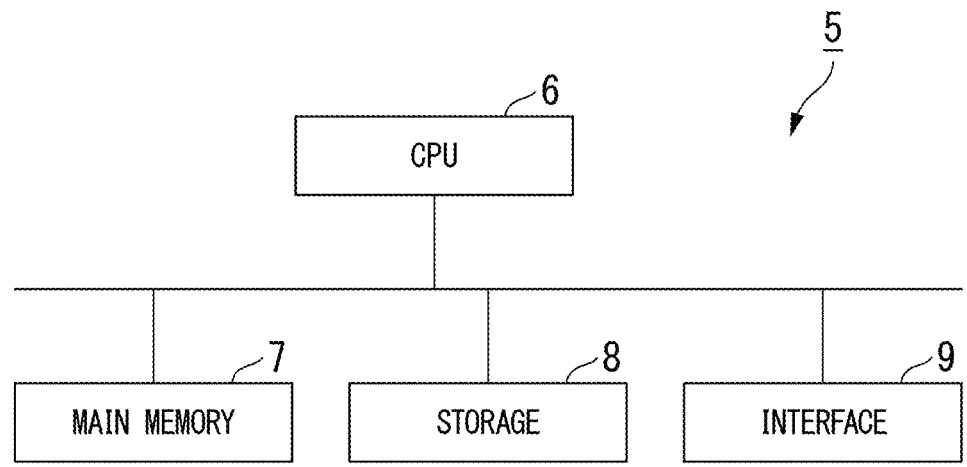
FIG. 20 is a schematic block diagram which shows a configuration of a computer according to at least one embodiment.

FIG. 20 is a schematic block diagram which shows a configuration of a computer according to at least one embodiment. A computer 5 includes, as shown in FIG. 20, a CPU 6, a main memory 7, a storage 8, and an interface 9. For example, each of the electric vehicle 20, the control circuit 215, the control unit 2151, the host system 30 and other control devices described above are mounted in the computer 5. Then, the operation of each processing unit described above is stored in the storage 8 in the form of a program. The CPU 6 reads the program from the storage 8, develops it in the main memory 7, and executes the above processing according to the program. In addition, the CPU 6 secures storage areas corresponding to the storage units described above in the main memory 7 according to the program.

Examples of the storage 8 include a hard disk drive (HDD), a solid-state drive (SSD), magnetic disk, a magneto-optical disk, a compact disc read only memory (CD-ROM), a digital versatile disc read only memory (DVD-ROM), a semiconductor memory, and the like. The storage 8 may be an internal medium directly connected to a bus of the computer 5, or an external medium connected to the computer 5 via an interface 9 or communication line. Moreover, when this program is delivered to the computer 5 via a communication line, the computer 5 that receives the delivery may develop the program in the main memory 7 and execute the processing described above. In at least one embodiment, the storage 8 is a non-transitory tangible storage medium.

In addition, the program described above may realize some of the functions described above. Furthermore, the program described above may be a file capable of realizing the functions described above in combination with a program already recorded in a computer system, that is, a so-called difference file (difference program).

Although several embodiments of the present disclosure have been described, these embodiments are examples and do not limit the scope of the disclosure. Various additions, omissions, replacements, and modifications may be made to these embodiments within a range not departing from the gist of the disclosure.

(Appendix)

The electric vehicle (20), the traffic system (1), the control method, and the program described in each embodiment of the present disclosure are ascertained, for example, as follows.

(1) A bidirectional DC-DC converter (216*a*) according to a first aspect includes a first circuit (216*a*1) that is configured to process a first voltage beings a DC voltage and that includes a first electronic component including a first switching element, a second circuit (216*a*2) that is configured to process a second voltage or a third voltage, the second voltage being a DC voltage supplied to the electric vehicle (20), the third voltage being a DC voltage generated in an electric vehicle (20), and that includes a second electric component with a lower withstand voltage than the first electronic component, the second electric component including a second switching element, and a control circuit (215) configured to control switching of at least one of the first switching element and the second switching element, wherein the bidirectional DC-DC converter is configured to convert the first voltage into the second voltage or convert the third voltage into the first voltage.

As a result, even if an electric component including a high withstand voltage electronic component is replaced with an electric component including an electronic component with a lower withstand voltage than the electric component, the bidirectional DC-DC converter (216*a*) can realize the same function as when the high withstand voltage electric component is used.

(2) The bidirectional DC-DC converter (216*a*) according to a second aspect is a bidirectional DC-DC converter of (1), and may include a transformer with a primary side and a secondary side, the primary side being connected to the first circuit (216*a*1), and the secondary side being connected to the second circuit (216*a*2).

As a result, the bidirectional DC-DC converter (216*a*) can insulate the first circuit (216*a*1)) and the second circuit (216*a*2).

(3) The bidirectional DC-DC converter (216*a*) according to a third aspect is a bidirectional DC-DC converter (216*a*) of (1), wherein the control circuit (215) may also perform chopper control for at least one of the first switching element and the second switching element.

As a result, the bidirectional DC-DC converter (216*a*) can separate a voltage on the overhead line 10 side and a voltage of the electric vehicle (20) without using a transformer.

(4) The bidirectional DC-DC converter (216*a*) according to a fourth aspect is the bidirectional DC-DC converter (216*a*) of any one of (1) to (3), wherein when the first voltage is different from the second voltage or when the first voltage is different from the third voltage, the control circuit (215) may shorten a cycle of switching at least one of the first switching element and the second switching element and provides a period during which the switching is not performed.

As a result, the bidirectional DC-DC converter (216*a*) can suppress hard switching.

(5) The bidirectional DC-DC converter (216*a*) according to a fifth aspect is the bidirectional DC-DC converter (216*a*) of any one of (1) to (4), wherein the control circuit (215) may control switching of the first switching element and the second switching element so as to shorten a first period than a second period, wherein one switching element between the first switching element and the second switching element is in an ON state in the first period, and the other switching element between the first switching element and the second switching element is in the ON state in the second period when the bidirectional DC-DC converter (216*a*) is started.

As a result, the bidirectional DC-DC converter (216*a*) can suppress overcurrent at the start and safely charge the capacitor to which electric power is transmitted.

(6) The traffic system (1) according to a sixth aspect includes the bidirectional DC-DC converter (216*a*) according to any one of first to fifth aspects, and a host system configured to transmit a torque command to the bidirectional DC-DC converter (216*a*).

As a result, even if an electric component including a high withstand voltage electronic component is replaced with an electric component including an electronic component with a lower withstand voltage than the electric component, it is possible to realize the same function as when the high withstand voltage electric component is used in the traffic system (1).

(7) A control method according to a seventh aspect is a control method to be executed by a bidirectional DC-DC converter that includes a first circuit (216*a*1) that is configured to process a first voltage being a DC voltage and that includes a first electronic component including a first switching element, and a second circuit (216*a*2) that is configured to process a second voltage or a third voltage, the second voltage being a DC voltage, supplied to an electric vehicle (20), the third voltage being a DC voltage generated in an electric vehicle (20), and that includes a second electric component with a lower withstand voltage than the first electronic component, the second electric component including a second switching element, the method including controlling switching of at least one of the first switching element and the second switching element, and converting the first voltage into the second voltage or converting the third voltage into the first voltage.

As a result, even if an electric component including a high withstand voltage electronic component is replaced with an electric component including an electric component with a lower withstand voltage than the electric component, it is possible to realize the same function as when the high withstand voltage electric component is used in the control method.

(8) A non-transitory computer-readable storage medium storing a program according to an eighth aspect causes a computer of a bidirectional DC-DC converter that includes a first circuit (216a1) that is configured to process a first voltage being a DC voltage and that includes a first electronic component including a first switching element, and a second circuit (216a2) that is configured to process a second voltage or a third voltage, the second voltage being a DC voltage supplied to an electric vehicle (20), the third voltage being a DC voltage generated in an electric vehicle (20), and that includes a second electric component with a lower withstand voltage than the first electronic component, the second electric component including a second switching element to execute controlling at least one of the first switching element and the second switching element, and converting the first voltage into the second voltage or converting the third voltage into the first voltage.

As a result, even if an electric component including a high withstand voltage electronic component is replaced with an electric component including an electric component with a lower withstand voltage than the electric component, it is possible to realize the same function as when the high withstand voltage electric component is used in the program.

What is claimed is:

1. A bidirectional DC-DC converter comprising:
   a first circuit that is configured to process a first voltage being a DC voltage and that includes a first electronic component including a first switching element;
   a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element;
   at least one rotation sensor that is configured to detect a number of rotations of wheels per unit time, the wheels being provided with the electric vehicle; and
   a control circuit that includes:
      an acquisition unit that is configured to acquire a detection result of the number of rotations of the wheels from the at least one rotation sensor;
      a determination unit that is configured to determine an idling of the wheels from the detection result acquired by the acquisition unit; and
      a control unit that is configured to control switching of at least one of the first switching element and the second switching element;
   wherein in a case where the control unit controls the switching of the first switching element, the control unit controls the switching of the first switching element based on a result of the determination by the determination unit; and
   the bidirectional DC-DC converter is configured to convert the first voltage into the second voltage or convert the third voltage into the first voltage.

2. The bidirectional DC-DC converter according to claim 1, further comprising:
   a transformer with a primary side and a secondary side, the primary side being connected to the first circuit, and the secondary side being connected to the second circuit.

3. The bidirectional DC-DC converter according to claim 1,
   wherein the control unit performs chopper control for at least one of the first switching element and the second switching element.

4. The bidirectional DC-DC converter according to claim 1,
   wherein, when the first voltage is different from the second voltage or when the first voltage is different from the third voltage, the control unit shortens a cycle of switching at least one of the first switching element and the second switching element and provides a period during which the switching is not performed.

5. The bidirectional DC-DC converter according to claim 1,
   wherein the control unit controls switching of the first switching element and the second switching element so as to shorten a first period than a second period when the bidirectional DC-DC converter is started, wherein one switching element between the first switching element and the second switching element is in an ON state in the first period, and the other switching element between the first switching element and the second switching element is in the ON state in the second period.

6. A traffic system comprising:
   the bidirectional DC-DC converter according to claim 1; and
   a host system configured to transmit a torque command to the bidirectional DC-DC converter.

7. A control method to be executed by a bidirectional DC-DC converter,
   the bidirectional DC-DC converter that includes
      a first circuit that is configured to process a first voltage being a DC voltage and that includes a first electronic component including a first switching element,
      a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element,
      at least one rotation sensor that is configured to detect a number of rotations of wheels per unit time, the wheels being provided with the electric vehicle, and
      a control circuit,
   the method comprising:
      acquiring a detection result of the number of rotations of the wheels from the at least one rotation sensor;
      determining an idling of the wheels from the detection result;
      controlling switching of at least one of the first switching element and the second switching element;
      in a case of controlling the switching of the first switching element, controlling the switching of the first switching element based on a result of the determination; and
      converting the first voltage into the second voltage or converting the third voltage into the first voltage.

8. A non-transitory computer-readable storage medium storing a program for a computer of a bidirectional DC-DC converter, the bidirectional DC-DC converter that includes a first circuit that is configured to process a first voltage being a DC voltage and that includes a first electronic component including a first switching element, a second circuit that is configured to process a second voltage or a third voltage, the second voltage being a DC voltage supplied to an electric vehicle, the third voltage being a DC voltage generated in an electric vehicle, and that includes a second electric component with a lower withstand voltage than the first electronic component, the second electric component including a second switching element, at least one rotation sensor that is configured to detect a number of rotations of wheels per unit time, the wheels being provided with the electric vehicle, and a control circuit, the program causing the computer to execute;

acquiring a detection result of the number of rotations of the wheels from the at least one rotation sensor;

determining an idling of the wheels from the detection result;

controlling at least one of the first switching element and the second switching element;

in a case of controlling the switching of the first switching element, controlling the switching of the first switching element based on a result of the determination; and converting the first voltage into the second voltage or converting the third voltage into the first voltage.

* * * * *